United States Patent
Moriya et al.

(10) Patent No.: US 9,882,343 B2
(45) Date of Patent: Jan. 30, 2018

(54) NARROW BAND LASER APPARATUS

(71) Applicant: Gigaphoton Inc., Tochigi (JP)

(72) Inventors: Masato Moriya, Oyama (JP); Takeshi Ohta, Oyama (JP); Keisuke Ishida, Oyama (JP); Takashi Kusama, Oyama (JP)

(73) Assignee: Gigaphoton Inc., Tochigi (JP)

(*) Notice: Subject to any disclaimer, the term of this patent is extended or adjusted under 35 U.S.C. 154(b) by 0 days.

(21) Appl. No.: 15/486,323

(22) Filed: Apr. 13, 2017

(65) Prior Publication Data
US 2017/0222391 A1    Aug. 3, 2017

Related U.S. Application Data

(63) Continuation of application No. PCT/JP2015/082798, filed on Nov. 20, 2015.

(30) Foreign Application Priority Data

Nov. 28, 2014  (WO) .................. PCT/JP2014/081660

(51) Int. Cl.
*H01S 3/13*     (2006.01)
*H01S 3/081*    (2006.01)
(Continued)

(52) U.S. Cl.
CPC ............ *H01S 3/13* (2013.01); *H01S 3/08004* (2013.01); *H01S 3/0811* (2013.01);
(Continued)

(58) Field of Classification Search
CPC . H01S 3/13; H01S 3/005; H01S 3/134; H01S 3/08009; H01S 3/1305;
(Continued)

(56) References Cited

U.S. PATENT DOCUMENTS 5,130,998 A * 7/1992 Wakata .................. H01S 3/137
                                                    372/108
5,420,877 A    5/1995 Sandstrom
                    (Continued)

FOREIGN PATENT DOCUMENTS

JP    H02-273981 A    11/1990
JP    H04-127488 A     4/1992
                    (Continued)

OTHER PUBLICATIONS

International Search Report issued in PCT/JP2015/082798; dated Feb. 9, 2016.

*Primary Examiner* — Kinam Park
(74) *Attorney, Agent, or Firm* — Studebaker & Brackett PC

(57) ABSTRACT

A narrow band laser apparatus may include: a laser resonator; a pair of discharge electrodes; a power supply; a first wavelength measurement device configured to output a first measurement result; a second wavelength measurement device configured to output a second measurement result; and a control unit. The control unit calibrates the first measurement result, based on a difference between the second measurement result derived when the control unit controls the power supply to apply a pulsed voltage to the pair of discharge electrodes with a first repetition frequency and the second measurement result derived when the control unit controls the power supply to apply the pulsed voltage to the pair of discharge electrodes with a second repetition frequency, the second repetition frequency being higher than the first repetition frequency.

12 Claims, 14 Drawing Sheets

(51) Int. Cl.
*H01S 3/082* (2006.01)
*H01S 3/08* (2006.01)
*H01S 3/137* (2006.01)
*G01J 3/28* (2006.01)
*H01S 3/134* (2006.01)
*H01S 3/225* (2006.01)

(52) U.S. Cl.
CPC ............ *H01S 3/0823* (2013.01); *H01S 3/137* (2013.01); *G01J 3/28* (2013.01); *H01S 3/08009* (2013.01); *H01S 3/08036* (2013.01); *H01S 3/134* (2013.01); *H01S 3/1305* (2013.01); *H01S 3/2251* (2013.01); *H01S 3/2256* (2013.01)

(58) Field of Classification Search
CPC ...... H01S 3/2251; H01S 3/2256; H01S 3/141; H01S 3/08004; H01S 3/0811; H01S 3/0823
See application file for complete search history.

(56) References Cited

U.S. PATENT DOCUMENTS

| | | | |
|---|---|---|---|
| 6,700,916 B1 * | 3/2004 | Kramer | G03F 7/70025 372/57 |
| 6,807,205 B1 | 10/2004 | Albrecht et al. | |
| 7,196,796 B2 | 3/2007 | Moriya et al. | |
| 2002/0005955 A1 * | 1/2002 | Kramer | G01J 9/0246 356/519 |
| 2004/0012844 A1 * | 1/2004 | Ohtsuki | B23K 26/0643 359/341.1 |
| 2004/0017833 A1 * | 1/2004 | Cundiff | H01S 3/1112 372/18 |
| 2005/0083983 A1 * | 4/2005 | Sandstrom | G01J 1/429 372/55 |
| 2005/0286598 A1 | 12/2005 | Sandstrom et al. | |
| 2013/0170508 A1 * | 7/2013 | Suzuki | H01S 3/13 372/5 |
| 2015/0340837 A1 * | 11/2015 | Matsunaga | H01S 3/137 372/20 |

FOREIGN PATENT DOCUMENTS

| | | |
|---|---|---|
| JP | H05-007031 A | 1/1993 |
| JP | H06-188502 A | 7/1994 |
| JP | 2001-196679 A | 7/2001 |
| JP | 2001-298234 A | 10/2001 |
| JP | 2003-185502 A | 7/2003 |
| JP | 2005-003389 A | 1/2005 |
| JP | 2005-003595 A | 1/2005 |
| JP | 2008-098282 A | 4/2008 |
| JP | 2013-214772 A | 10/2013 |
| WO | 2014/156407 A1 | 10/2014 |

* cited by examiner

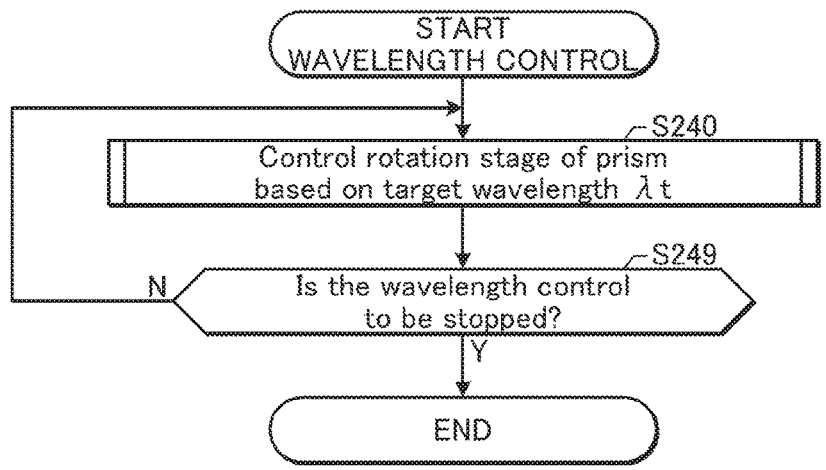
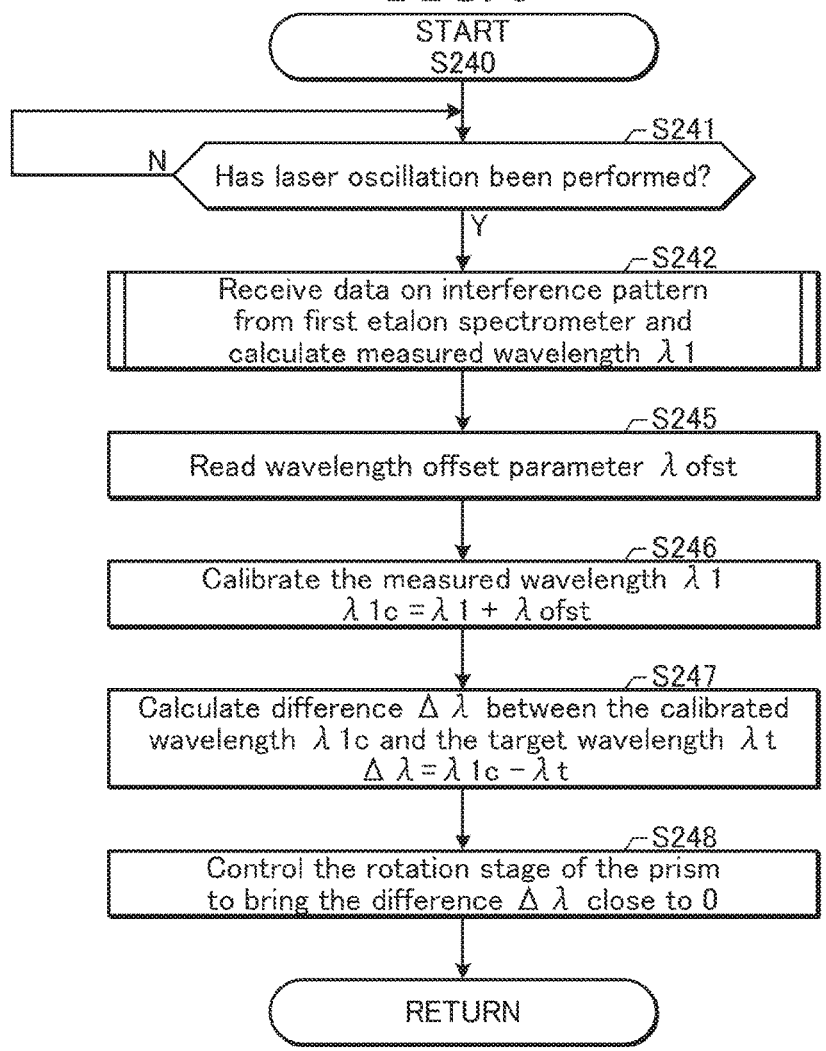

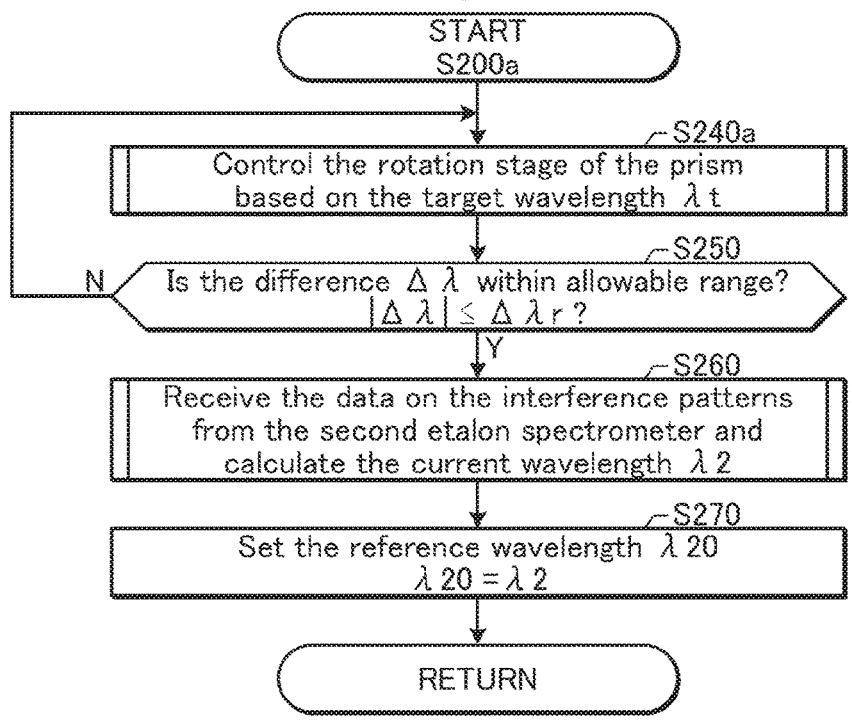
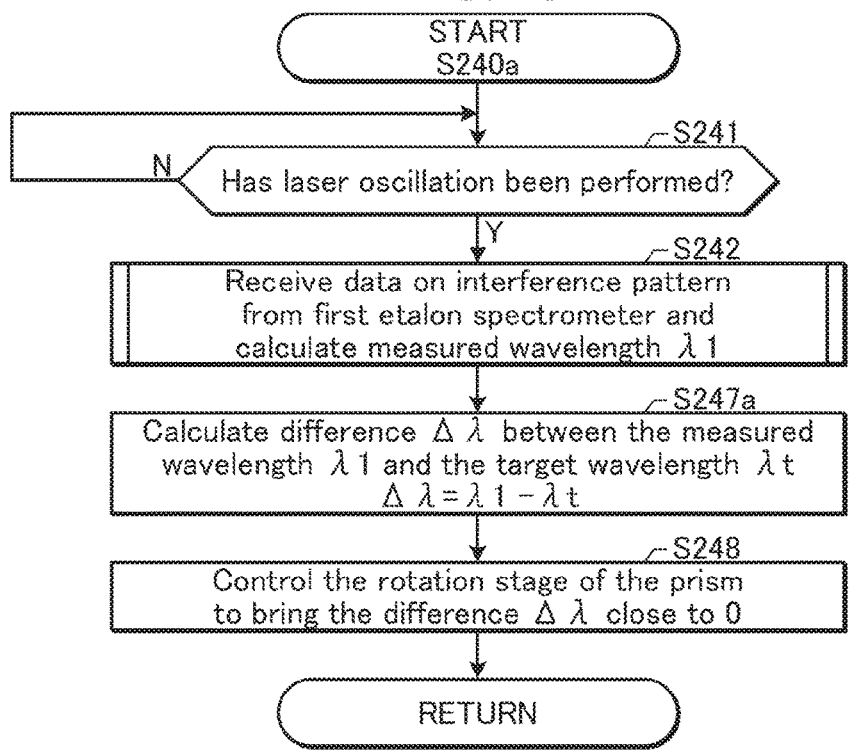

NARROW BAND LASER APPARATUS

TECHNICAL FIELD

The present disclosure relates to a narrow band laser apparatus.

BACKGROUND ART

The recent miniaturization and increased levels of integration of semiconductor integrated circuits has led to a demand for increases in the resolutions of semiconductor exposure devices. A semiconductor exposure device is referred to as an "exposure device" hereinafter. Accordingly, reduction of the wavelengths of light emitted from exposure light sources is improving. Typically, gas laser apparatuses are used as exposure light sources instead of conventional mercury lamps. For example, a KrF excimer laser apparatus that outputs an ultraviolet laser beam at a wavelength of 248 nm and an ArF excimer laser apparatus that outputs an ultraviolet laser beam at a wavelength of 193 nm are used as gas laser apparatuses for exposure.

As a current exposure technology, immersion exposure has been put into practical use. In the immersion exposure, a gap between an exposure lens in an exposure apparatus and a wafer is filled with fluid, and an apparent wavelength of the exposure light source is shortened by changing the refractive index of the gap. In a case where immersion exposure is performed using an ArF excimer laser apparatus as an exposure light source, a wafer is irradiated with ultraviolet light whose wavelength in water is equivalent to 134 nm. This technique is referred to as "ArF immersion exposure". ArF immersion exposure is also referred to as "ArF immersion lithography".

Spectrum line widths of KrF and ArF excimer laser apparatuses in natural oscillation amplitudes are as wide as approximately 350 to 400 pm. This causes a chromatic aberration of a laser beam (ultraviolet light) that is subjected to reduced projection onto a wafer by a projection lens on the side of an exposure device, thus causing a reduction in resolving power. Therefore, a spectrum line width of a laser beam that is outputted from a gas laser apparatus needs to be narrowed to such an extent that the chromatic aberration can be ignored. The spectrum line width is also referred to as "spectrum width". To narrow the spectrum width, a laser resonator of a gas laser apparatus is provided with a line narrow module having a line narrow element. The line narrow element may be an etalon, a grating, or the like. A laser apparatus whose spectrum width is narrowed in this way is referred to as "narrow band laser apparatus".

LIST OF DOCUMENTS

Patent Documents

Patent Document 1: U.S. Pat. No. 7,196,796
Patent Document 2: U.S. Pat. No. 5,420,877
Patent Document 3: United States Patent Application Publication No. 2013/0170508
Patent Document 4: Japanese Patent Application Publication No. H06-188502
Patent Document 5: Japanese Patent Application Publication No. H05-007031
Patent Document 6: Japanese Patent Application Publication No. 2001-298234
Patent Document 7: Japanese Patent Application Publication No. H02-273981
Patent Document 8: Japanese Patent Application Publication No. H04-127488
Patent Document 9: Japanese Patent Application Publication No. 2005-003389
Patent Document 10: Japanese Patent Application Publication No. 2003-185502

SUMMARY

A narrow band laser apparatus according to an aspect of the present disclosure may include: a laser resonator including an optical element to narrow a spectral width; a pair of discharge electrodes disposed with an optical path of a pulse laser beam of the laser resonator interposed therebetween; a power supply configured to apply a pulsed voltage to the pair of discharge electrodes; a first wavelength measurement device configured to measure a wavelength of the pulse laser beam outputted from the laser resonator and output a first measurement result; a second wavelength measurement device configured to measure the wavelength of the pulse laser beam outputted from the laser resonator and output a second measurement result; and a control unit configured to calibrate the first measurement result, based on the second measurement result. The control unit calibrates the first measurement result, based on a difference between the second measurement result derived when the control unit controls the power supply to apply the pulsed voltage to the pair of discharge electrodes with a first repetition frequency and the second measurement result derived when the control unit controls the power supply to apply the pulsed voltage to the pair of discharge electrodes with a second repetition frequency, the second repetition frequency being higher than the first repetition frequency.

A narrow band laser apparatus according to another aspect of the present disclosure may include: a laser resonator including an optical element to narrow a spectral width; a first wavelength measurement device configured to measure a wavelength of a pulse laser beam outputted from the laser resonator and output a first measurement result; a second wavelength measurement device configured to measure the wavelength of the pulse laser beam outputted from the laser resonator and output a second measurement result; and a control unit configured to calibrate the first measurement result, based on the second measurement result. The control unit may acquire the second measurement result as a reference wavelength in at least one of situations where a target wavelength is varied by a certain amount or more, where oscillation suspension of the pulse laser beam is continued for a certain period of time or more, and where a parameter relating to wavelength measurement is updated, acquire the second measurement result after acquiring the reference wavelength, and calibrate the first measurement result, based on a difference between the reference wavelength and the second measurement result after acquiring the reference wavelength.

BRIEF DESCRIPTION OF DRAWINGS

Exemplary embodiments of the present disclosure will be described hereinafter with reference to the appended drawings.

FIG. 4 is a flowchart illustrating processing of wavelength control by a wavelength control unit illustrated in FIG. 1.

FIG. 5 is a flowchart illustrating a detail of a process of controlling a rotation stage illustrated in FIG. 4.

FIG. 12 is a flowchart illustrating a detail of a process of calculating the reference wavelength λ20 illustrated in FIG. 11.

FIG. 13 is a flowchart illustrating a detail of a process of controlling the rotation stage, illustrated in FIG. 12.

DESCRIPTION OF EMBODIMENTS

Figure 1A:
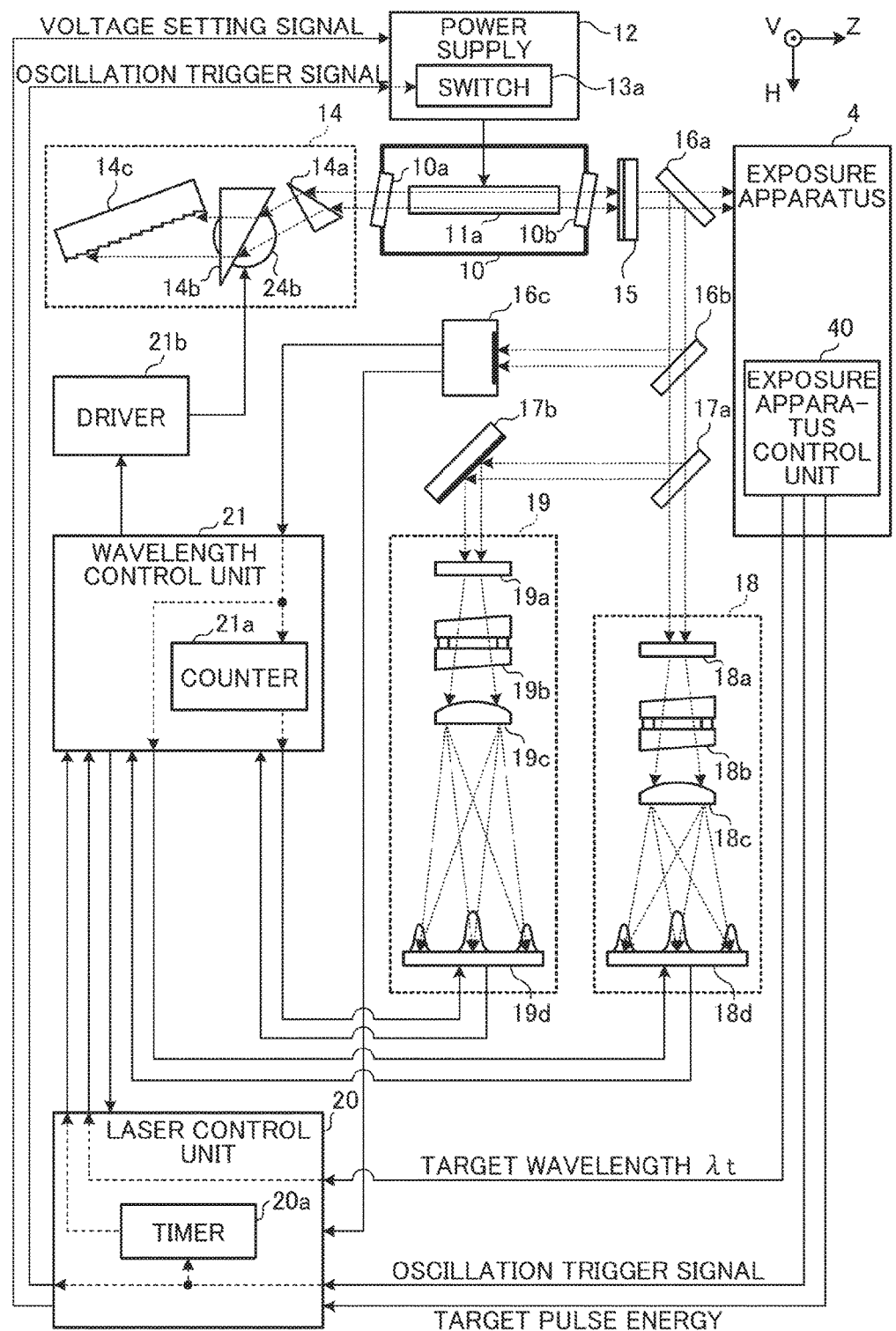
FIG. 1A schematically illustrates a configuration of a narrow band laser apparatus according to a first embodiment.

<Contents>
1. Outline
2. Narrow Band Laser Apparatus Including Wavelength Measurement Device (First Embodiment)
   2.1 Laser Chamber
   2.2 Line Narrowing Module
   2.3 Output Coupling Mirror
   2.4 Energy Sensor
   2.5 Etalon Spectrometer
   2.6 Control Unit
   2.7 Output Pattern of Pulse Laser Beam
   2.8 Wavelength Control
   2.9 Flowchart
     2.9.1 Wavelength Control
     2.9.2 Calculation of Wavelength Offset Parameter
     3. Variation of Calculation of Current Wavelength λ2 (Second Embodiment)
     4. Variation of Calculation of Reference Wavelength λ20 (Third Embodiment)
5. Variation of Etalon Spectrometer (Fourth Embodiment)
6. Configuration of Control Unit Embodiments of the present disclosure are described in detail below with reference to drawings. The embodiments described below illustrate some examples of the present disclosure and do not intend to limit contents of the present disclosure. In addition, all of configurations and operations described in the embodiments are not necessarily essential as components and operations of the present disclosure. Note that the same constituent elements are denoted by the same reference numerals and redundant description is omitted.

1. Outline

In an exposure apparatus that performs exposure with a double pattern or a triple pattern, a focal point of a reduced projection lens may change due to change in an oscillation wavelength of a narrow band laser apparatus. Therefore, control of a wavelength of the narrow band laser apparatus may be important. To control the wavelength, the narrow band laser apparatus may be equipped with an etalon spectrometer. The wavelength may be controlled based on a measurement result of the wavelength of the laser beam measured by the etalon spectrometer.

It is found, however, that the characteristics of the etalon spectrometer may be varied due to change in an oscillation condition of the narrow band laser apparatus, for example, change in a duty. When the characteristics of the etalon spectrometer are varied, the wavelength of the narrow band laser apparatus, which is controlled based on the measurement result of the wavelength measured by the etalon spectrometer, may unintentionally change. This may affect exposure performance.

According to one aspect of the present disclosure, a part of the pulse laser beam may be blanched into a first pulse laser beam and a second pulse laser beam. The first pulse laser beam may have a first light quantity, and the second pulse laser beam may have a second light quantity that is lower than the first light quantity. A wavelength of the first pulse laser beam may be measured by a first wavelength measurement device, and a wavelength of the second pulse laser beam may be measured by a second wavelength measurement device. A measurement result of the first wavelength measurement device may be calibrated, based on a measurement result of the second wavelength measurement device.

The first wavelength measurement device may output the measurement result at a first frequency. The second wavelength measurement device may output the measurement result at a second frequency that is lower than the first frequency.

2. Narrow Band Laser Apparatus Including Wavelength Measurement Device (First Embodiment)

Figure 1B:
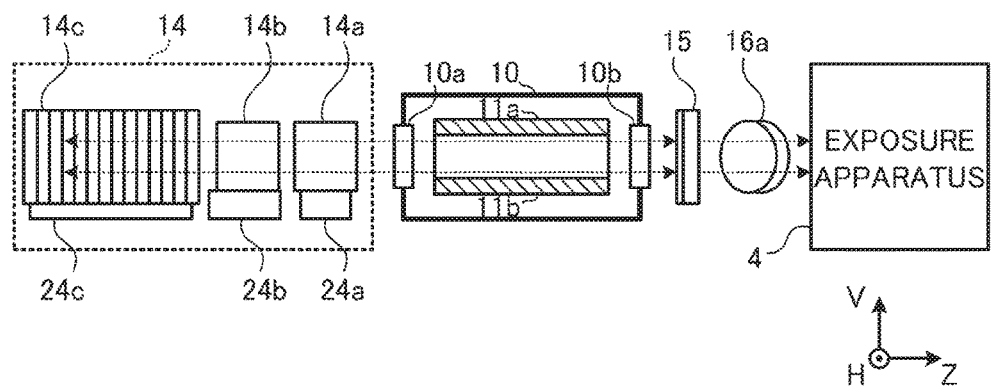
FIG. 1B schematically illustrates a configuration of a part of the narrow band laser apparatus according to the first embodiment.

FIGS. 1A and 1B each schematically illustrates a configuration of a narrow band laser apparatus according to a first embodiment. The narrow band laser apparatus illustrated in FIGS. 1A and 1B may include a laser chamber 10, a pair of discharge electrodes 11a and 11b, a power supply 12, a line narrowing module 14, and an output coupling mirror 15. The narrow band laser apparatus may further include an energy sensor 16c, a first etalon spectrometer 18, a second etalon spectrometer 19, a laser control unit 20, and a wavelength control unit 21. The narrow band laser apparatus may be a master oscillator that performs laser oscillation to output seed light that enters an amplifier (not illustrated).

FIG. 1A shows an internal configuration of the laser apparatus as viewed from a direction substantially parallel to a discharge direction between the pair of discharge electrodes 11a and 11b. FIG. 1B shows the internal configuration of the laser apparatus as viewed from a direction that is substantially perpendicular to the discharge direction between the pair of discharge electrodes 11a and 11b and is substantially perpendicular to a traveling direction of the laser beam outputted from the output coupling mirror 15. The traveling direction of the laser beam outputted from the output coupling mirror 15 may be a Z direction. The discharge direction between the pair of discharge electrodes 11a and 11b may be a V direction or −V direction. A direction perpendicular to these directions may be an H direction. The −V direction may be substantially coincident with a direction of the gravity.

2.1 Laser Chamber

The laser chamber 10 may be a chamber into which laser gas is sealed. The laser gas contains, for example, rare gas such as argon gas and krypton gas, halogen gas such as fluorine gas and chlorine gas, and buffer gas such as neon gas and helium gas. Windows 10a and 10b may be provided on respective ends of the laser chamber 10.

The pair of discharge electrodes 11a and 11b may be disposed inside the laser chamber 10, as electrodes that excite a laser medium through discharge. A pulsed high voltage may be applied between the pair of discharge electrodes 11a and 11b from the power supply 12. The power supply 12 may include a charger (not illustrated) and a pulse power module (not illustrated). The pulse power module may include a switch 13a. When an oscillation trigger signal is supplied from the laser control unit 20 to the switch 13a, the power supply 12 may generate the above-described pulsed high voltage that is to be applied between the pair of discharge electrodes 11a and 11b.

When the high voltage is applied between the pair of discharge electrodes 11a and 11b, discharge may occur between the pair of discharge electrodes 11a and 11b. The energy of the discharge may excite the laser medium inside the laser chamber 10 to a high energy level. When the excited laser medium shifts back to a low energy level thereafter, the laser medium may emit light corresponding to a difference in the energy level.

As illustrated in FIG. 1A, the windows 10a and 10b may be disposed such that a plane of incident of the light entering each window is substantially coincident with an HZ plane and an incident angle of the light is substantially equal to the Brewster's angle. The light generated inside the laser chamber 10 may be outputted to the outside of the laser chamber 10 through the windows 10a and 10b.

2.2 Line Narrowing Module

The line narrowing module 14 may include two prisms 14a and 14b, a grating 14c, and holders 24a to 24c. The prism 14a may be held by the holder 24a, the prism 14b may be held by the holder 24b, and the grating 14c may be held by the holder 24c.

The prisms 14a and 14b may expand a beam width in the H direction of the light that has been outputted from the window 10a of the laser chamber 10, thereby causing the light to be incident on the grating 14c. Further, the prisms 14a and 14b may reduce a beam width in the H direction of reflected light from the grating 14c, and may return the light to a discharge space inside the laser chamber 10 through the window 10a.

The grating 14c may have a surface that is made of a highly-reflective material, and a lot of grooves may be provided on the surface at predetermined intervals. Each of the grooves may be, for example, a right triangle groove. The light that has entered the grating 14c from the prisms 14a and 14b may be reflected by the grooves and diffracted toward a direction corresponding to the wavelength of the light. The grating 14c may be disposed in Littrow arrangement to allow the incident angle of the light incident on the grating 14c from the prisms 14a and 14b, to be coincident with a diffractive angle of the diffracted light having a desired wavelength. This may return the light having a wavelength near the desired wavelength to the laser chamber 10 through the prisms 14a and 14b.

The holder 24b holding the prism 14b may include a rotation stage (not illustrated) that rotates the prism 14b around an axis parallel to the V axis. Rotating the prism 14b may change the incident angle of the light incident on the grating 14c, which may change the wavelength selected with the grating 14c.

2.3 Output Coupling Mirror

A front surface of the output coupling mirror 15 may be coated with a partially-reflective film. The output coupling mirror 15 may thus allow a part of the light that has been outputted from the window 10b of the laser chamber 10, to pass therethrough and be outputted, and may reflect the other part of the light, thereby returning the reflected part of the light into the laser chamber 10.

The line narrowing module 14 and the output coupling mirror 15 may configure an optical resonator. The light that has been outputted from the laser chamber 10 may be reciprocated between the line narrowing module 14 and the output coupling mirror 15, and may be amplified every time the light passes through the discharge space between the discharge electrodes 11a and 11b, to cause laser oscillation. The spectral width of the laser beam is narrowed every time the laser beam is turned by the line narrowing module 14. Further, a polarization component in the H direction may be selected by the above-described arrangement of the windows 10a and 10b. The laser beam thus amplified may be outputted from the output coupling mirror 15 toward the exposure apparatus 4.

2.4 Energy Sensor

A beam splitter 16a may be disposed in an optical path of the pulse laser beam between the output coupling mirror 15 and the exposure apparatus 4. The beam splitter 16a may allow the pulse laser beam outputted from the output coupling mirror 15 to pass therethrough with high transmittance, and may reflect a part of the pulse laser beam outputted from the output coupling mirror 15. Another beam splitter 16b may be disposed in the optical path of the pulse laser beam that has been reflected by the beam splitter 16a. The beam splitter 16b may allow a part of the pulse laser beam that has been reflected by the beam splitter 16a to pass therethrough, and may reflect another part of the pulse laser beam that has been reflected by the beam splitter 16a.

The energy sensor 16c may be disposed in an optical path of the pulse laser beam that has been reflected by the beam splitter 16b. The energy sensor 16c may detect pulse energy of the pulse laser beam that has been reflected by the beam splitter 16b. The energy sensor 16c may provide data on the detected pulse energy to both the laser control unit 20 and the wavelength control unit 21. The energy sensor 16c may be a photodiode, a photoelectric tube, or a pyroelectric element.

2.5 Etalon Spectrometer

A beam splitter 17a may be disposed in an optical path of the pulse laser beam that has passed through the beam splitter 16b. The beam splitter 17a may allow a part of the pulse laser beam that has passed through the beam splitter 16b to pass therethrough, and may reflect another part of the pulse laser beam that has passed through the beam splitter 16b. A light quantity of the pulse laser beam that has passed through the beam splitter 17a may be larger than a light quantity of the pulse laser beam that has been reflected by the beam splitter 17a.

A first etalon spectrometer 18 may be disposed in an optical path of the pulse laser beam that has passed through the beam splitter 17a.

A highly-reflective mirror 17b may be disposed in an optical path of the pulse laser beam that has been reflected by the beam splitter 17a. The highly-reflective mirror 17b may reflect the pulse laser beam that has been reflected by the beam splitter 17a with high reflectance. A second etalon spectrometer 19 may be disposed in an optical path of the pulse laser beam that has been reflected by the highly-reflective mirror 17b.

The first etalon spectrometer 18 may include a diffusion plate 18a, an etalon 18b, a light condensing lens 18c, and a line sensor 18d. The second etalon spectrometer 19 may include a diffusion plate 19a, an etalon 19b, a light condensing lens 19c, and a line sensor 19d.

Each of the diffusion plates 18a and 19a may be a transmissive optical element having a rough surface. The diffusion plates 18a and 19a may allow the pulse laser beam that has entered the respective diffusion plates 18a and 19a to pass therethrough as scattering light. The scattering light that has passed through the diffusion plates 18a and 19a may respectively enter the etalons 18b and 19b.

Each of the etalons 18b and 19b may be an air-gap etalon including two partially-reflective mirrors each having a predetermined reflectance R. In the air-gap etalon, the two partially-reflective mirrors may face each other with a predetermined air gap d in between, and may be bonded to each other with a spacer in between.

A difference between an optical path length of light that passes through the etalon 18b without being reciprocated between the two partially-reflective mirrors and an optical path length of light that passes through the etalon 18b after being reciprocated between the two partially-reflective mirrors may be varied depending on an incident angle θ of the light that has entered the etalon 18b. The light that has entered the etalon 18b may pass through the etalon 18b with high transmittance when the above-described difference of the optical path length is an integer m times of the wavelength λ. A basic equation of the etalon is described below:

$$m\lambda = 2nd \cos \theta \quad (1)$$

where n may be a refractive index in the air gap.

The light having the wavelength λ that has entered the etalon 18b may pass through the etalon 18b with high transmittance when the incident angle θ of the light satisfies the formula (1).

Accordingly, the incident angle θ of the light that passes through the etalon 18b with high transmittance may be varied according to the wavelength of the light that enters the etalon 18b. The same may occur in the etalon 19b.

The light that has passed through the etalons 18b and 19b may enter the respective light condensing lenses 18c and 19c.

Each of the light condensing lenses 18c and 19c may be an optical element having light condensing capability. The light that has passed through the light condensing lenses 18c and 19c may enter the respective line sensors 18d and 19d that are disposed at positions corresponding to respective focal lengths from the light condensing lenses 18c and 19c. The light that has passed through the light condensing lenses 18c and 19c may form interference patterns in the respective line sensors 18d and 19d. As described in Patent Document 5, the square of a radius of the interference pattern may have a proportional relation with the wavelength λ of the pulse laser beam as derived from the formula (1).

The line sensors 18d and 19d may respectively receive the light that has passed through the light condensing lenses 18c and 19c and detect the corresponding interference patterns. Each of the line sensors 18d and 19d may receive a data output trigger from the wavelength control unit 21. Each of the line sensors 18d and 19d may output data on the corresponding interference pattern to the wavelength control unit 21 when receiving the data output trigger. Note that a two-dimensional image sensor (not illustrated) may be used in place of each of the line sensors 18d and 19d.

In the present disclosure, the light quantity of the pulse laser beam that enters the second etalon spectrometer 19 may be lower than the light quantity of the pulse laser beam that enters the first etalon spectrometer 18. Preferably, the light quantity per one pulse of the incident light on the second etalon spectrometer 19 may be about one-fifth or more or about one-twelfth or less of the light quantity per one pulse of the incident light on the first etalon spectrometer 18. Therefore, the variation in characteristics of the second etalon spectrometer 19 caused by the energy of the pulse laser beam may be smaller than the variation in characteristics of the first etalon spectrometer 18 caused by the energy of the pulse laser beam. Calibrating, with use of the wavelength that is calculated based on the output of the second etalon spectrometer 19, the wavelength that is calculated based on the output of the first etalon spectrometer 18 may make it possible to control the wavelength more precisely.

Further, resolution of the second etalon spectrometer 19 may be higher than resolution of the first etalon spectrometer 18. The higher resolution of the second etalon spectrometer 19 may make it possible to more precisely calibrate the wavelength that is calculated based on the output of the first etalon spectrometer 18. When the full width at half maximum of the respective device functions of the first etalon spectrometer 18 and the second etalon spectrometer 19 are denoted by $\Delta\lambda_{IF1}$ and $\Delta\lambda_{IF2}$, the full width at half maximum $\Delta\lambda_{IF1}$ of the first etalon spectrometer 18 may be preferably larger than the full width at half maximum $\Delta\lambda_{IF2}$ of the second etalon spectrometer 19. More preferably, the value of $\Delta\lambda_{IF1}/\Delta\lambda_{IF2}$ may be five or more and seven or less. The device function of the etalon spectrometer may be measured by using the laser beam that enters the etalon spectrometer. The laser beam used in the measurement may have a wavelength of 193 nm in single vertical mode.

As a specific etalon specification, when free spectral ranges ($=\lambda^2/(2nd)$) of the first etalon spectrometer 18 and the second etalon spectrometer 19 are respectively denoted by $FSR_1$ and $FSR_2$, the free spectral range $FSR_1$ of the first etalon spectrometer 18 may be preferably larger than the free spectral range $FSR_2$ of the second etalon spectrometer 19. More preferably, the value of $FSR_1/FSR_2$ may be five or more and seven or less. Further, the focal length of the light condensing lens 19c may be preferably larger than the focal length of the light condensing lens 18c.

2.6 Control Unit

The exposure apparatus 4 may include an exposure apparatus control unit 40. The exposure apparatus control unit 40 may perform control such as movement of a wafer stage (not illustrated). The exposure apparatus control unit 40 may provide data on a target wavelength λt, data on target pulse energy, and the oscillation trigger signal to the laser control unit 20.

The laser control unit 20 may transmit, to the wavelength control unit 21, the data on the target wavelength λt that has been provided by the exposure apparatus control unit 40.

The laser control unit 20 may refer to the data on the target pulse energy that has been provided by the exposure apparatus control unit 40 and the data on the pulse energy that has been provided by the energy sensor 16c, thereby controlling a setting value of the charging voltage of the power supply 12. By controlling the setting value of the charging voltage of the power supply 12, the laser control unit 20 may control the pulse energy of the pulse laser beam.

The laser control unit 20 may provide the oscillation trigger signal to the switch 13a included in the power supply 12, based on the oscillation trigger signal that has been provided from the exposure apparatus control unit 40.

The laser control unit 20 may measure an oscillation interval ΔT, based on the oscillation trigger signal that has been provided from the exposure apparatus control unit 40. The laser control unit 20 may include a timer 20a that measures the oscillation interval ΔT. The oscillation interval ΔT may be a time period from the time at which the laser control unit 20 receives one oscillation trigger signal until the time at which the laser control unit 20 receives the next oscillation trigger signal. The laser control unit 20 may provide data on the measured oscillation interval ΔT to the wavelength control unit 21.

When receiving the data on the pulse energy from the energy sensor 16c, the wavelength control unit 21 may provide the above-described data output trigger to the line sensor 18d that is included in the first etalon spectrometer 18. In other words, the first etalon spectrometer 18 may provide the data on the interference pattern to the wavelength control unit 21 every time the first etalon spectrometer 18 receives one pulse laser beam.

When receiving the data on the pulse energy from the energy sensor 16c predetermined number of times, the wavelength control unit 21 may provide the above-described data output trigger to the line sensor 19d that is included in the second etalon spectrometer 19. In other words, the second etalon spectrometer 19 may provide an integrated value of data on the interference patterns for the predetermined number of times to the wavelength control unit 21 every time the second etalon spectrometer 19 receives the pulse laser beam the predetermined number of times. The predetermined number of times may be Jmax described later. To count the predetermined number of times, the wavelength control unit 21 may include a counter 21a.

The wavelength control unit 21 may receive the data on the interference pattern from the first etalon spectrometer 18, thereby measuring the radius of the interference pattern, and may calculate a measured wavelength λ1 based on the measured radius of the interference pattern.

The wavelength control unit 21 may receive the integrated value of the data on the interference patterns from the second etalon spectrometer 19, thereby measuring the radius of the interference pattern, and may calculate a current wavelength λ2 based on the measured radius of the interference pattern.

The wavelength control unit 21 may calculate a wavelength offset parameter λofst described later, based on the current wavelength λ2 that has been detected by the second etalon spectrometer 19 based on the interference pattern.

The wavelength control unit 21 may calculate a calibrated wavelength λ1c, based on the measured wavelength λ1 calculated by the first etalon spectrometer 18 and the wavelength offset parameter λofst. The wavelength control unit 21 may control the rotation stage of the holder 24b that holds the prism 14b, to bring the calibrated wavelength λ1c close to the target wavelength λt. The wavelength control unit 21 may transmit the control signal to the driver 21b that is connected with the rotation stage of the holder 24b, thereby controlling the rotation stage.

2.7 Output Pattern of Pulse Laser Beam

Figure 2:
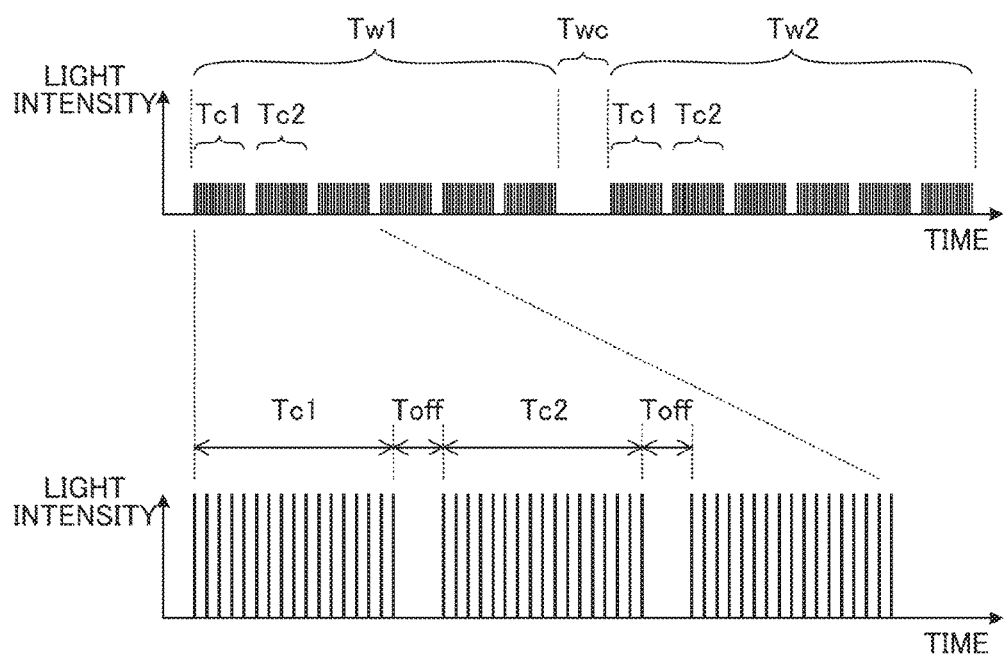
FIG. 2 illustrates an example of an output pattern of a pulse laser beam by the narrow band laser apparatus.

FIG. 2 illustrates an example of the output pattern of the pulse laser beam by the narrow band laser apparatus. In a graph at upper side in FIG. 2, a light emitting period Tw1 in which a first semiconductor wafer is exposed, a light emitting period Tw2 in which a second semiconductor wafer is exposed, and a wafer exchange period Twc between the light emitting periods Tw1 and Tw2 are illustrated. Light may not be emitted during the wafer exchange period Twc. Alternatively, adjustment oscillation described later may be performed during the wafer exchange period Twc.

The light emitting period Tw1 in which the first semiconductor wafer is exposed may include an oscillation period Tc1 in which a first chip region is exposed, an oscillation period Tc2 in which a second chip region is exposed, and other periods. The light emitting period Tw2 in which the second semiconductor wafer is exposed may include similar periods.

In a graph at lower side in FIG. 2, the oscillation period Tc1 in which the first chip region is exposed and the oscillation period Tc2 in which the second chip region is exposed illustrated at the upper side in FIG. 2 are illustrated in an enlarged manner. In the graph at the lower side in FIG. 2, an oscillation suspension period Toff in which the wafer stage (not illustrated) is moved is illustrated between the oscillation periods.

Oscillation to output the pulse laser beam may be performed with a high repetition frequency, for example, 1 kHz or higher and 6 kHz or lower during the oscillation period Tc1 in which the first chip region is exposed. Oscillation to output the pulse laser beam may also be performed in a similar manner during the oscillation period Tc2 in which the second chip region is exposed.

A duty D of the pulse laser beam may be calculated by the following formula:

$$D=(Ton/(Ton+Toff))\times 100(\%)$$

where Ton may be an oscillation period in which one chip region is exposed, and Toff may be the oscillation suspension period until next oscillation period.

Alternatively, the duty D of the pulse laser beam may be calculated by the following formula:

$$D=(N/(fmax\cdot Ts))\times 100(\%)$$

where fmax may be a maximum repetition frequency of the narrow band laser apparatus, Ts may be a sample period to obtain the duty D, and N may be the number of oscillation pulses during the sample period Ts.

As mentioned above, in the present specification, an operation pattern of the laser oscillation in which oscillation is performed with the predetermined repetition frequency f during the predetermined time period Ton and the oscillation is suspended during the predetermined time period Toff is referred to as burst operation in some cases.

2.8 Wavelength Control

Figure 3A:
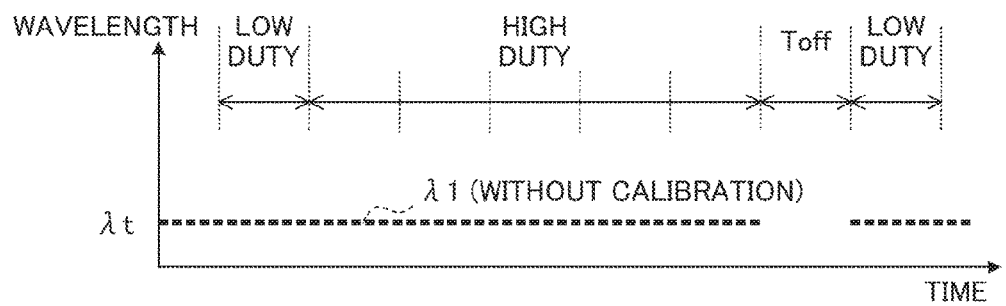
FIG. 3A is a graph illustrating an example of a measured wavelength λ1 that is detected by a first etalon spectrometer 18 based on an interference pattern when a measurement result of the wavelength is not calibrated.

FIG. 3A is a graph illustrating an example of the measured wavelength λ1 that is detected by the first etalon spectrometer 18 based on the interference pattern when the measurement result of the wavelength is not calibrated. If the measurement result of the wavelength is not calibrated, the wavelength control unit 21 may control the rotation stage of the holder 24b that holds the prism 14b, to bring the measured wavelength λ1 close to the target wavelength λt. Accordingly, the measured wavelength λ1 may be maintained at a substantially fixed value close to the target wavelength λt.

Figure 3B:
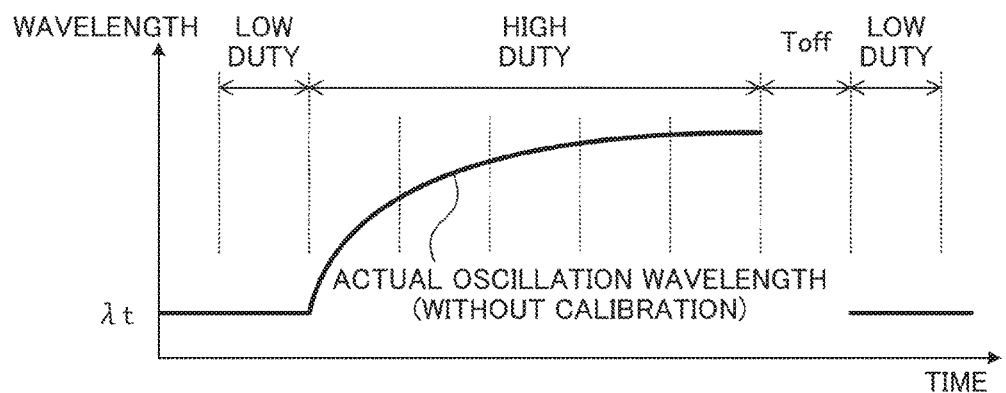
FIG. 3B is a graph illustrating an example of an actual oscillation wavelength when the measurement result of the wavelength is not calibrated.

FIG. 3B is a graph illustrating an example of the actual oscillation wavelength when the measurement result of the wavelength is not calibrated. It is found that, when the measured wavelength λ1 is maintained at the substantially fixed value, the actual oscillation wavelength also becomes a substantially fixed value close to the target wavelength λt during the period in which the duty is low but the actual oscillation wavelength is deviated from the target wavelength λt when the duty becomes high.

The cause of such wavelength deviation may be as follows.

First, the temperature of the etalon may be varied by the energy of the pulse laser beam that enters the etalon, which may result in the deviation of the measured wavelength.

Second, because of low resolution of the etalon spectrometer, change in the spectrum waveform accompanied by change in the wavelength may result in the deviation of the measured wavelength.

In the present disclosure, the measurement result of the wavelength based on the output of the first etalon spectrometer 18 may be calibrated with use of the measurement result of the wavelength based on the output of the second etalon spectrometer 19.

Figure 3C:
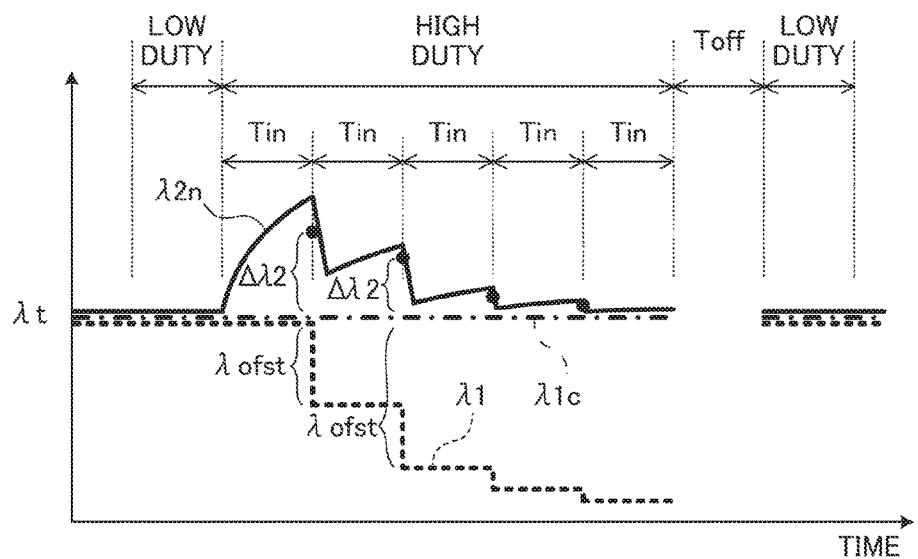
FIG. 3C is a graph to explain processing of calibrating the measurement result of the wavelength.

FIG. 3C is a graph to explain processing of calibrating the measurement result of the wavelength. The detail of FIG. 3C is described later.

2.9 Flowchart 2.9.1 Wavelength Control

FIG. 4 is a flowchart illustrating processing of the wavelength control by the wavelength control unit illustrated in FIG. 1. The wavelength control unit 21 may control the oscillation wavelength of the narrow band laser apparatus through the following processing, based on the target wavelength λt. As described later with reference to step S241 of FIG. 5, the processing of the wavelength control illustrated in FIG. 4 may be executed for each pulse included in the pulse laser beam.

First, in step S240, the wavelength control unit 21 may control the rotation stage of the holder 24b that holds the prism 14b, based on the target wavelength λt. The detail of the process is described later with reference to FIG. 5.

Next, in step S249, the wavelength control unit 21 may determine whether to stop the wavelength control. For example, when it is necessary to prioritize laser control other than the wavelength control, the wavelength control unit 21 may determine to stop the wavelength control. If the wavelength control is not to be stopped (NO in step S249), the wavelength control unit 21 may return the process to step S240 mentioned above. If the wavelength control is to be stopped (YES in step S249), the wavelength control unit 21 may terminate the processing of the flowchart.

FIG. 5 is a flowchart illustrating the detail of the process of controlling the rotation stage illustrated in FIG. 4. The process illustrated in FIG. 5 may be executed by the wavelength control unit 21, as a subroutine of step S240 illustrated in FIG. 4.

First, in step S241, the wavelength control unit 21 may determine whether the narrow band laser apparatus has performed laser oscillation. For example, if the wavelength control unit 21 receives the data on the pulse energy from the energy sensor 16c once, the wavelength control unit 21 may determine that the narrow band laser apparatus has performed the laser oscillation. If the narrow band laser apparatus has not performed the laser oscillation (NO in step S241), the wavelength control unit 21 may wait until the narrow band laser apparatus performs the laser oscillation. If the narrow band laser apparatus has performed the laser oscillation (YES in step S241), the wavelength control unit 21 may advance the process to step S242.

In step S242, the wavelength control unit 21 may receive the data on the interference pattern from the first etalon spectrometer 18, thereby calculating the measured wavelength λ1. The detail of the process is described later with reference to FIG. 8.

Thereafter, in step S245, the wavelength control unit 21 may read the wavelength offset parameter λofst from a memory (not illustrated). The wavelength offset parameter λofst may be calculated in the process illustrated in FIG. 6 described later.

Thereafter, in step S246, the wavelength control unit 21 may calibrate the measured wavelength λ1 by the following formula to calculate the calibrated wavelength λ1c:

$$\lambda 1c = \lambda 1 + \lambda ofst$$

Thereafter, in step S247, the wavelength control unit 21 may calculate a difference Δλ between the calibrated wavelength λ1c and the target wavelength λt by the following formula:

$$\Delta\lambda = \lambda 1c - \lambda t$$

Thereafter, in step S248, the wavelength control unit 21 may control the rotation stage of the holder 24b that holds the prism 14b, to bring the difference Δλ between the calibrated wavelength λ1c and the target wavelength λt close to zero.

The wavelength control unit 21 may perform control based on the target wavelength λt through the above-described processes.

2.9.2 Calculation of Wavelength Offset Parameter

Figure 6:
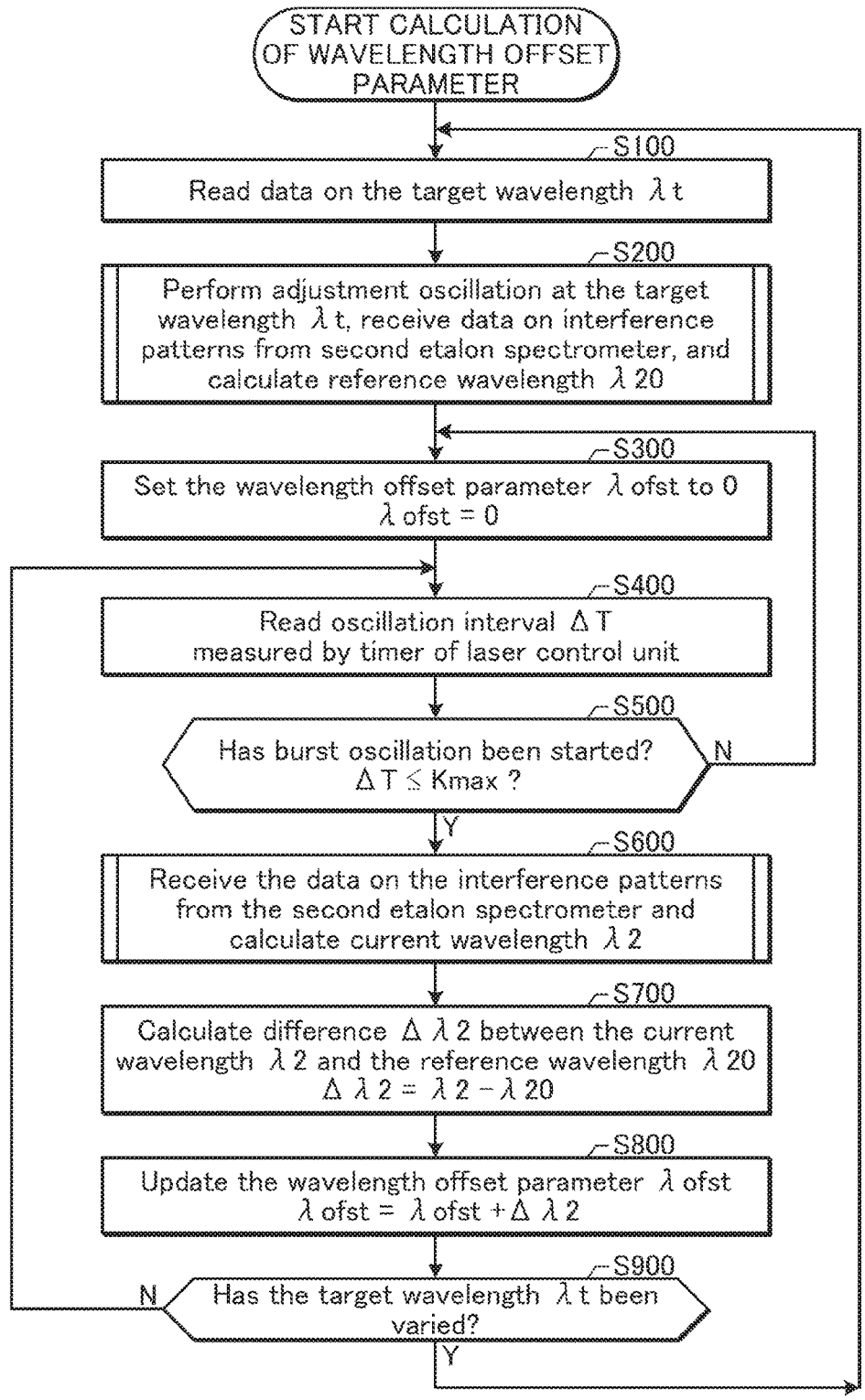
FIG. 6 is a flowchart illustrating processing of calculating a wavelength offset parameter by the wavelength control unit illustrated in FIG. 1.

FIG. 6 is a flowchart illustrating processing of calculating the wavelength offset parameter by the wavelength control unit illustrated in FIG. 1. The wavelength control unit 21 may receive the integrated value of the data on the interference patterns from the second etalon spectrometer 19 to calculate the wavelength offset parameter λofst through the following processes.

First, in step S100, the wavelength control unit 21 may read the data on the target wavelength λt. The data on the target wavelength λt may be provided from the laser control unit 20.

Thereafter, in step S200, the wavelength control unit 21 may perform adjustment oscillation in a low duty at the target wavelength λt, and receive the integrated value of the data on the interference patterns from the second etalon spectrometer 19, thereby calculating a reference wavelength λ20. The detail of the process is described later with reference to FIG. 7.

Thereafter, in step S300, the wavelength control unit 21 may set the wavelength offset parameter λofst to zero as an initial value.

Thereafter, in step S400, the wavelength control unit 21 may read the value of the oscillation interval ΔT that has been measured by the timer 20a of the laser control unit 20.

Thereafter, in step S500, the wavelength control unit 21 may determine whether the burst oscillation has been started. The burst oscillation used herein may indicate a state in which the pulse oscillation is repeatedly performed at the oscillation interval ΔT that is equal to or lower than a threshold Kmax. For example, the threshold Kmax may be one second or more and two seconds or less. If the burst oscillation has not been started (NO in step S500), the wavelength control unit 21 may return the process to step S300 described above. If the burst oscillation has been started (YES in step S500), the wavelength control unit 21 may advance the process to step S600.

In step S600, the wavelength control unit 21 may receive the integrated value of the data on the interference patterns from the second etalon spectrometer 19 to calculate the current wavelength λ2. The detail of the process is described later with reference to FIG. 9. As described later with reference to steps S604 to S611 in FIG. 9, the value of the current wavelength λ2 may be calculated for every Jmax×n pulses included in the pulse laser beam.

Next, in step S700, the wavelength control unit 21 may calculate a difference Δλ2 between the current wavelength λ2 and the reference wavelength λ20 by the following formula:

$$\Delta\lambda 2 = \lambda 2 - \lambda 20$$

Next, in step S800, the wavelength control unit 21 may add the difference Δλ2 to the value of the current wavelength offset parameter λofst as expressed by the following formula, thereby updating the value of the wavelength offset parameter λofst:

$$\lambda ofst = \lambda ofst + \Delta\lambda 2$$

Next, in step S900, the wavelength control unit 21 may determine whether the target wavelength λt has been varied. If the target wavelength λt has not been varied (NO in step S900), the wavelength control unit 21 may return the process to step S400 described above. If the target wavelength λt has been varied (YES in step S900), the wavelength control unit 21 may return the process to step S100 described above.

The wavelength control unit 21 may calculate the wavelength offset parameter λofst in the manner described above. The value of the wavelength offset parameter λofst thus calculated may be used to calibrate the measured wavelength λ1 in steps S245 and S246 described above with reference to FIG. 5.

Figure 7:
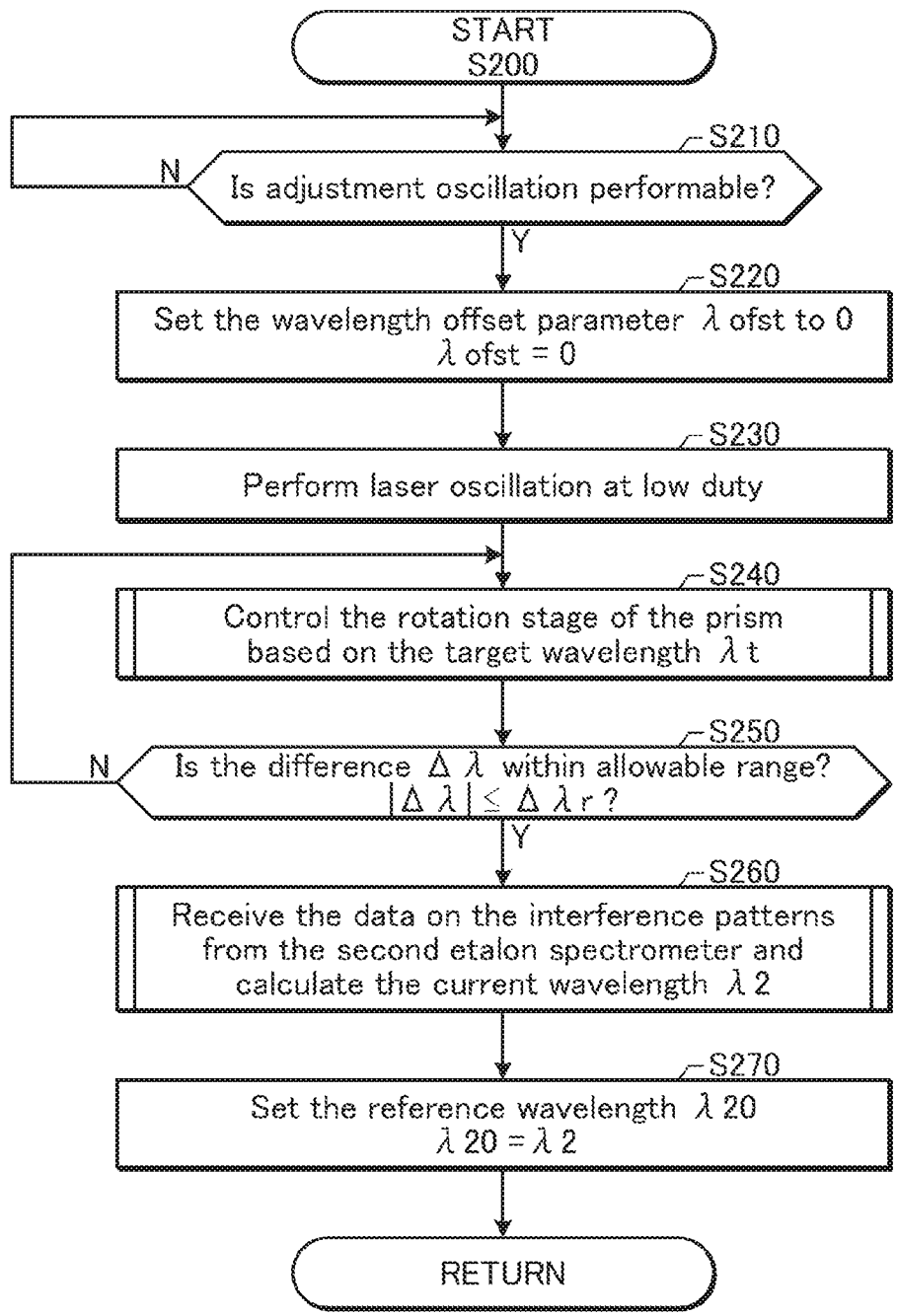
FIG. 7 is a flowchart illustrating a detail of a process of calculating a reference wavelength λ20 illustrated in FIG. 6.

FIG. 7 is a flowchart illustrating the detail of the process of calculating the reference wavelength λ20 illustrated in FIG. 6. The process illustrated in FIG. 7 may be executed by the wavelength control unit 21, as a subroutine of step S200 illustrated in FIG. 6.

First, in step S210, the wavelength control unit 21 may determine whether the adjustment oscillation is performable. Examples of the case in which the adjustment oscillation is performable may include the following cases:
(1) In a case in which an instruction to acquire the reference wavelength λ20 is provided from the exposure apparatus control unit 40;
(2) In the wafer exchange period Twc between the light emitting period Tw1 in which the first semiconductor wafer is exposed and the light emitting period Tw2 in which the second semiconductor wafer is exposed; and
(3) In activation process before the laser apparatus performs the exposure operation in which the semiconductor wafer is exposed.

If the adjustment oscillation is not performable (NO in step S210), the wavelength control unit 21 may wait until the adjustment oscillation becomes performable. If the adjustment oscillation is performable (YES in step S210), the wavelength control unit 21 may advance the process to step S220.

In step S220, the wavelength control unit 21 may set the wavelength offset parameter λofst to zero as an initial value.

Next, in step S230, the wavelength control unit 21 may send a signal to the laser control unit 20 to cause the narrow band laser apparatus to perform laser oscillation at low duty. The laser oscillation at the low duty may be referred to as the adjustment oscillation. The low duty may indicate, for example, a duty in a case in which the laser oscillation is performed with the repetition frequency of about 100 Hz. The duty in this case is 100/6000=1.7%. When performing the adjustment oscillation, the laser control unit 20 may provide the oscillation trigger signal to the switch 13a of the power supply 12 without receiving the oscillation trigger signal from the exposure apparatus control unit 40.

Thereafter, in step S240, the wavelength control unit 21 may control the rotation stage of the holder 24b that holds the prism 14b, based on the target wavelength λt. The process may be similar to the process described with reference to FIGS. 4 and 5. In this case, as described in step S220, the wavelength offset parameter λofst may be zero. In other words, the calibrated wavelength λ1c of the measured wavelength λ1 may be equal to the measured wavelength λ1. As described in step S230, during the period with low duty, matching the measured wavelength λ1 with the target wavelength λt may bring the actual oscillation wavelength close to the target wavelength λt.

Thereafter, in step S250, the wavelength control unit 21 may determine whether the difference Δλ described with reference to FIG. 5 is within an allowable range. For example, the wavelength control unit 21 may determine whether an absolute value of the difference Δλ is equal to or lower than a predetermined threshold Δλr. If the difference Δλ is out of the allowable range (NO in step S250), the wavelength control unit 21 may return the process to step S240 described above. If the difference Δλ is within the allowable range (YES in step S250), the wavelength control unit 21 may advance the process to step S260.

In step S260, the wavelength control unit 21 may receive the integrated value of the data on the interference patterns from the second etalon spectrometer 19 to calculate the current wavelength λ2. The process may be similar to the process in step S600 described with reference to FIG. 6. The detail of the process is described later with reference to FIG. 9.

Thereafter, in step S270, the wavelength control unit 21 may set the reference wavelength λ20. The current wavelength λ2 that has been calculated in step S260 may be set as the reference wavelength λ20.

After step S270, the wavelength control unit 21 may shift the process to step S300 described with reference to FIG. 6.

The wavelength control unit 21 may calculate the reference wavelength λ20 in the manner described above.

Figure 8:
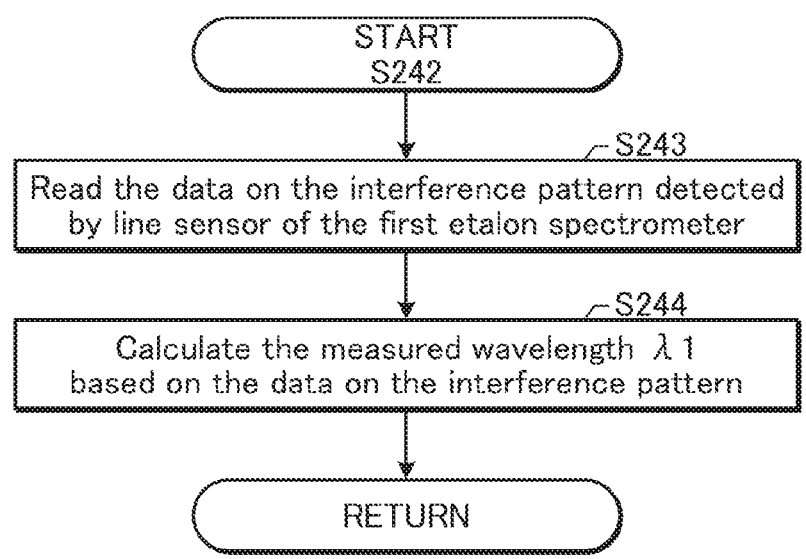
FIG. 8 is a flowchart illustrating a detail of a process of receiving data on the interference pattern from the first etalon spectrometer to calculate the measured wavelength λ1, illustrated in FIG. 5.

FIG. 8 is a flowchart illustrating the detail of the process of receiving the data on the interference pattern from the first etalon spectrometer 18 to calculate the measured wavelength λ1, illustrated in FIG. 5. The process illustrated in FIG. 8 may be executed by the wavelength control unit 21, as a subroutine of step S242 illustrated in FIG. 5.

First, in step S243, the wavelength control unit 21 may read the data on the interference pattern detected by the line sensor 18d of the first etalon spectrometer 18.

Thereafter, in step S244, the wavelength control unit 21 may calculate the measured wavelength $\lambda 1$, based on the data on the interference pattern.

After step S244, the wavelength control unit 21 may shift the process to step S245 described with reference to FIG. 5.

The wavelength control unit 21 may calculate the measured wavelength $\lambda 1$ in the manner described above.

Figure 9:
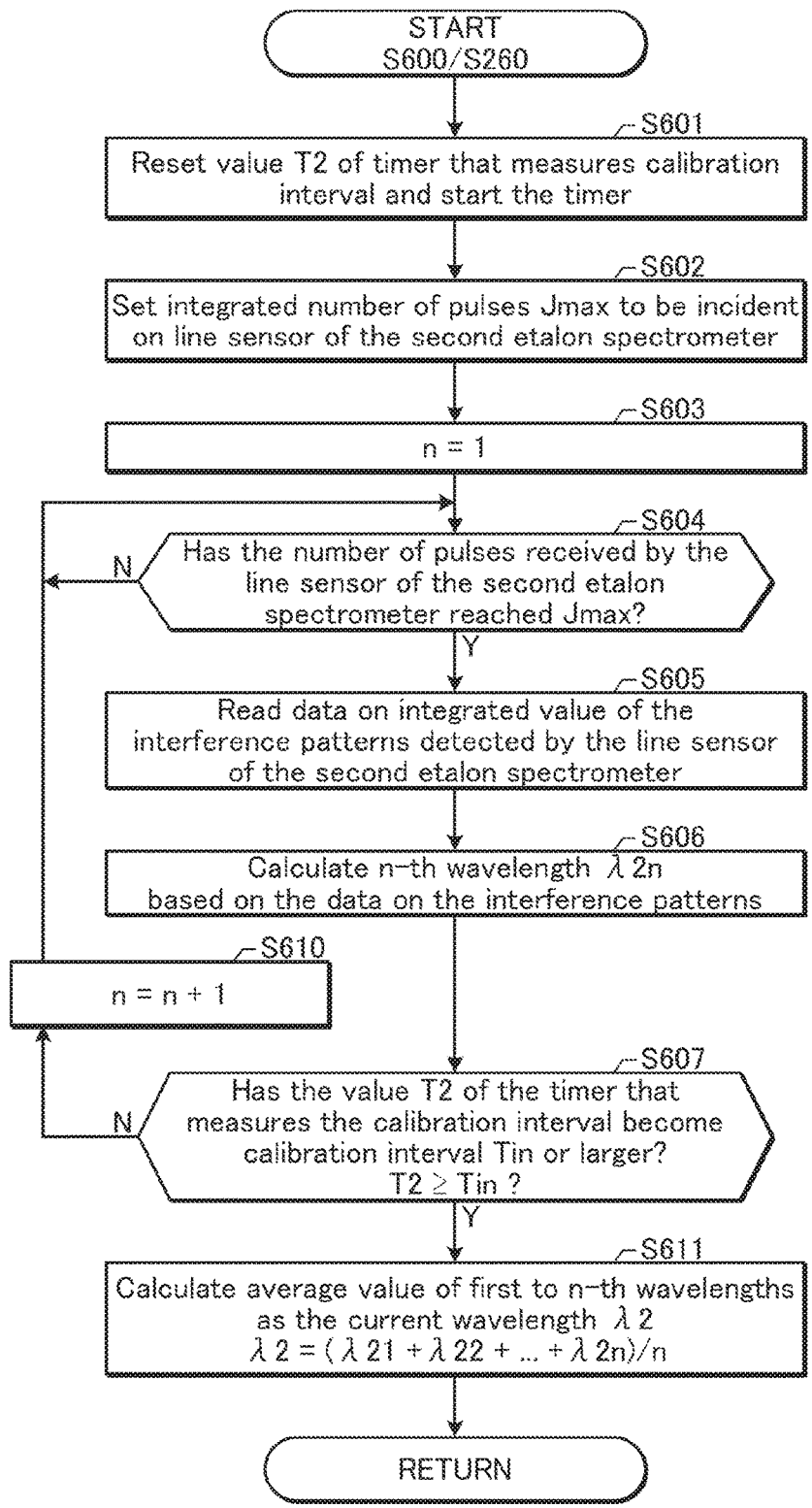
FIG. 9 is a flowchart illustrating a detail of a process of receiving data on interference patterns from a second etalon spectrometer to calculate a current wavelength λ2, illustrated in FIGS. 6 and 7.

FIG. 9 is a flowchart illustrating the detail of the process of receiving the data on the interference patterns from the second etalon spectrometer 19 to calculate the current wavelength $\lambda 2$. The process illustrated in FIG. 9 may be executed by the wavelength control unit 21, as a subroutine of step S600 illustrated in FIG. 6 or a subroutine of step S260 illustrated in FIG. 7.

First, in step S601, the wavelength control unit 21 may reset a value T2 of a timer (not illustrated) and start the count of the value T2 of the timer to measure the calibration interval.

Next, in step S602, the wavelength control unit 21 may set the integrated number of pulses Jmax to be incident on the line sensor 19d of the second etalon spectrometer 19. The integrated number of pulses Jmax may be, for example, about 40 pulses. Here, the integrated number of pulses Jmax is set to the counter 21a in the wavelength control unit 21 and the counter 21a measures the number of pulses from the energy sensor 16c and transmits a read signal of the data to the line sensor 19d; however, the present disclosure is not limited to this. Any software may measure the number of pulses from the energy sensor 16c, transmit the read signal of the data to the line sensor 19d, reset the counter, and then measure the number of pulses again.

Thereafter, in step S603, the wavelength control unit 21 may set the value of the counter n to one. The line sensor 19d of the second etalon spectrometer 19 may start detection of the interference patterns of the pulse laser beam. The line sensor 19d of the second etalon spectrometer 19 may detect the interference patterns of a plurality of pulses and integrate the data on the detected interference patterns.

Thereafter, in step S604, the wavelength control unit 21 may determine whether the number of pulses received by the line sensor 19d of the second etalon spectrometer 19 has reached the integrated number of pulses Jmax. If the number of pulses received by the line sensor 19d has not reached the integrated number of pulses Jmax (NO in step S604), the wavelength control unit 21 may wait until the number of pulses received by the line sensor 19d reaches the integrated number of pulses Jmax. If the number of pulses received by the line sensor 19d has reached the integrated number of pulses Jmax (YES in step S604), the wavelength control unit 21 may advance the process to step S605.

In step S605, the wavelength control unit 21 may read the data on the integrated value of the interference patterns detected by the line sensor 19d of the second etalon spectrometer 19.

Thereafter, in step S606, the wavelength control unit 21 may calculate the n-th wavelength $\lambda 2n$, based on the data on the integrated value of the interference patterns.

Thereafter, in step S607, the wavelength control unit 21 may determine whether the value T2 of the timer that measures the calibration interval has become a calibration interval Tin or larger. If the value T2 of the timer that measures the calibration interval has not become the calibration interval Tin or larger (NO in step S607), the wavelength control unit 21 may advance the process to step S610. If the value T2 of the timer that measures the calibration interval has become the calibration interval Tin or larger (YES in step S607), the wavelength control unit 21 may advance the process to step S611. The calibration interval Tin may be, for example, 100 ms.

In step S610, the wavelength control unit 21 may add one to the value of the counter n, thereby updating the value of the counter n. After step S610, the wavelength control unit 21 may return the process to step S604 described above.

In step S611, the wavelength control unit 21 may calculate, as the current wavelength $\lambda 2$, an average value of first to n-th wavelengths by the following formula:

$$\lambda 2 = (\lambda 21 + \lambda 22 + \ldots + \lambda 2n)/n$$

The wavelength control unit 21 may calculate the current wavelength $\lambda 2$ through the above-described processes. The current wavelength $\lambda 2$ calculated in the above-described manner may be used to set the reference wavelength $\lambda 20$ in step S270 that is described above with reference to FIG. 7. Further, the current wavelength $\lambda 2$ calculated in the above-described manner may be used to update the wavelength offset parameter $\lambda$ofst in step S700 and step S800 that are described above with reference to FIG. 6.

The description is given with reference to FIG. 30C again. In the present disclosure, as mentioned above with reference to FIG. 5, the rotation stage of the holder 24b that holds the prism 14b may be controlled to bring the difference between the calibrated wavelength $\lambda 1c$ and the target wavelength $\lambda t$ close to zero. Moreover, as mentioned above with reference to FIG. 9, the average value of the wavelengths $\lambda 21$, $\lambda 22$, ..., $\lambda 2n$ during the period of the calibration interval Tin may be calculated as the current wavelength $\lambda 2$.

The above-described control based on the calibrated wavelength $\lambda 1c$ and the target wavelength $\lambda t$ may stabilize the wavelength $\lambda 2n$ near the target wavelength $\lambda t$ in the adjustment oscillation with the low duty. If the burst oscillation with high duty is started, however, the wavelength $\lambda 2n$ may be separated from the target wavelength $\lambda t$ due to the cause such as characteristic variation of the first etalon spectrometer 18. Therefore, the wavelength offset parameter $\lambda$ofst may be updated based on the difference $\Delta \lambda 2$ between the current wavelength $\lambda 2$ and the reference wavelength $\lambda 20$ that has been calculated in the adjustment oscillation with the low duty. Then, the wavelength offset parameter $\lambda$ofst may be added to the measured wavelength $\lambda 1$ calculated by the first etalon spectrometer 18, thereby calculating the calibrated wavelength $\lambda 1c$. This may reduce the difference between the wavelength $\lambda 2n$ and the target wavelength $\lambda t$ to control the wavelength more precisely.

The above-described control based on the calibrated wavelength $\lambda 1c$ and the target wavelength $\lambda t$ may be executed for each pulse included in the pulse laser beam. In contrast, the update of the wavelength offset parameter $\lambda$ofst based on the difference $\Delta \lambda 2$ may be executed for every Jmax×n pulses included in the pulse laser beam. As mentioned above, since the frequency of the wavelength control is lower than the frequency of the calibration, even if the light quantity per one pulse of the incident light on the second etalon spectrometer 19 for calibration is small, it is possible to perform accurate calibration by accumulating and averaging the data for the wavelength $\lambda 2n$.

3. Variation of Calculation of Current Wavelength $\lambda 2$ (Second Embodiment)

Figure 10:
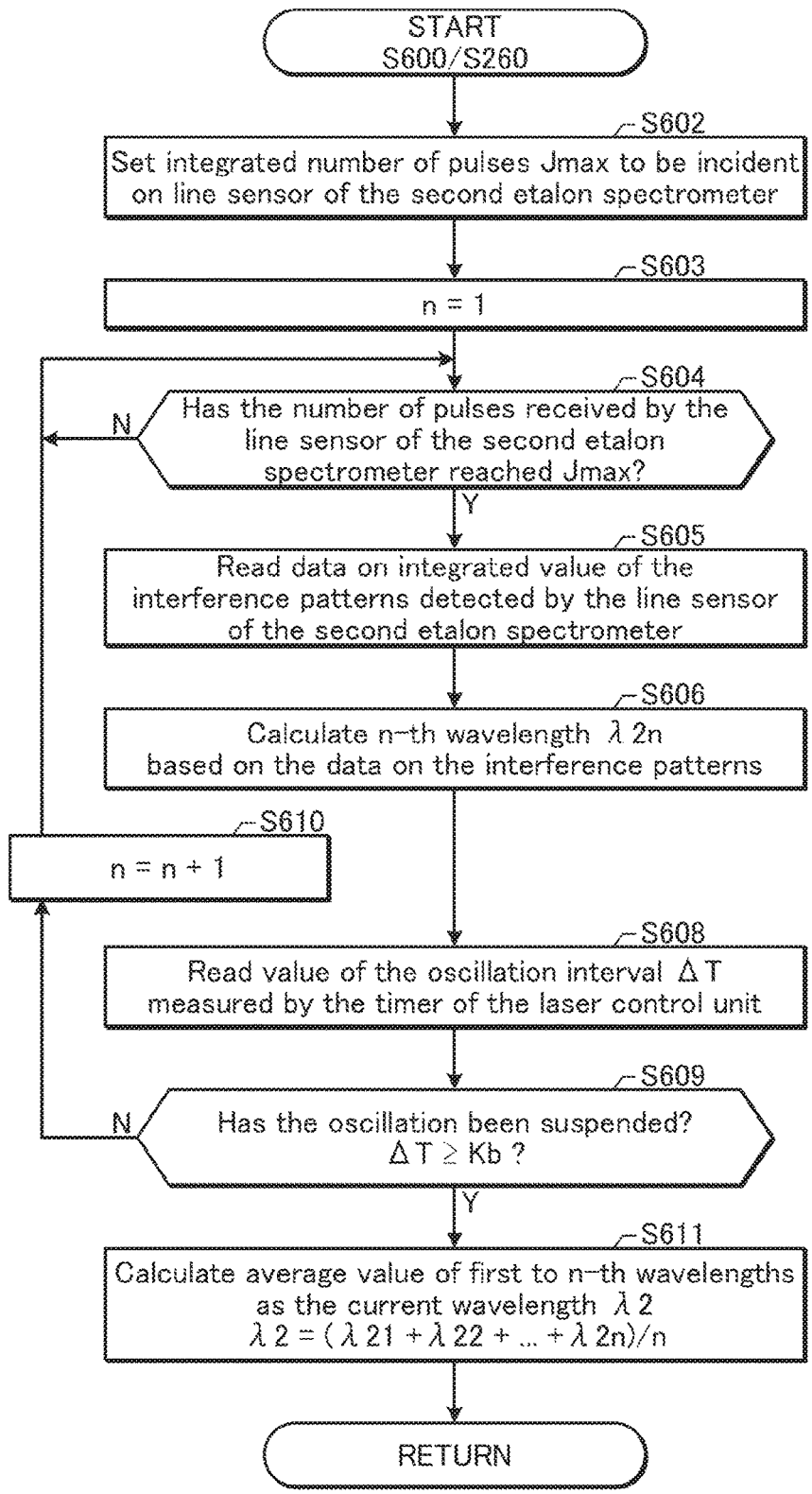
FIG. 10 is a flowchart illustrating a detail of a process of calculating a current wavelength λ2 in a narrow band laser apparatus according to a second embodiment of the present disclosure.

FIG. 10 is a flowchart illustrating the detail of a process of calculating a current wavelength $\lambda 22$ in a narrow band laser apparatus according to a second embodiment of the present disclosure. The second embodiment may be different from the first embodiment in calculation of the current wavelength $\lambda 2$.

The processes in steps S602 to S606 and the processes in steps S610 and S611 that are illustrated in FIG. 10 may be similar to the corresponding processes in the first embodiment that has been described with reference to FIG. 9. The value T2 of the timer that determines the calibration interval Tin may not be used in the second embodiment.

As illustrated in FIG. 10, in step S608, the wavelength control unit 21 may read the value of the oscillation interval $\Delta T$ that has been measured by the timer 20a of the laser control unit 20. Here, the oscillation interval $\Delta T$ is measured by the timer 20a in the laser control unit; however, the present disclosure is not limited to this, and the measurement of the oscillation interval $\Delta T$ may be performed through software processing.

Thereafter, in step S609, the wavelength control unit 21 may determine whether the oscillation has been suspended. As used herein, suspend oscillation may indicate a situation where the value of the oscillation interval $\Delta T$ is equal to or larger than a threshold Kb. The threshold Kb may be, for example, 0.1 second or more and 0.2 second or less. If the oscillation has not been suspended (NO in step S609), the wavelength control unit 21 may advance the process to step S610. If the oscillation has been suspended (YES in step S609), the wavelength control unit 21 may advance the process to step S611 to calculate the current wavelength $\lambda 2$.

According to the second embodiment, the wavelength control unit 21 may calculate the current wavelength $\lambda 2$ and update the wavelength offset parameter $\lambda$ofst every time the oscillation of the pulse laser beam is suspended. Since the wavelength offset parameter $\lambda$ofst is updated for each burst oscillation and the wavelength is calibrated for each chip region that is actually exposed, as mentioned above, the variation in the wavelength for the exposure in the chip region may be suppressed.

The present disclosure is not limited to the above description, and for example, the value of the counter n may be read in place of performing step S608 mentioned above. Then, it may be determined whether the value of the counter n has reached an upper limit value nmax, in place of performing step S609 mentioned above. If the value of the counter n reaches the upper limit value nmax, the process may be advanced to step S611 and the current wavelength $\lambda 2$ may be calculated. In this case, the wavelength offset parameter $\lambda$ofst may be updated for every certain number of pulses. The certain number of pulses may be Jmax×nmax.

4. Variation of Calculation of Reference Wavelength $\lambda 20$ (Third Embodiment)

Figure 11:
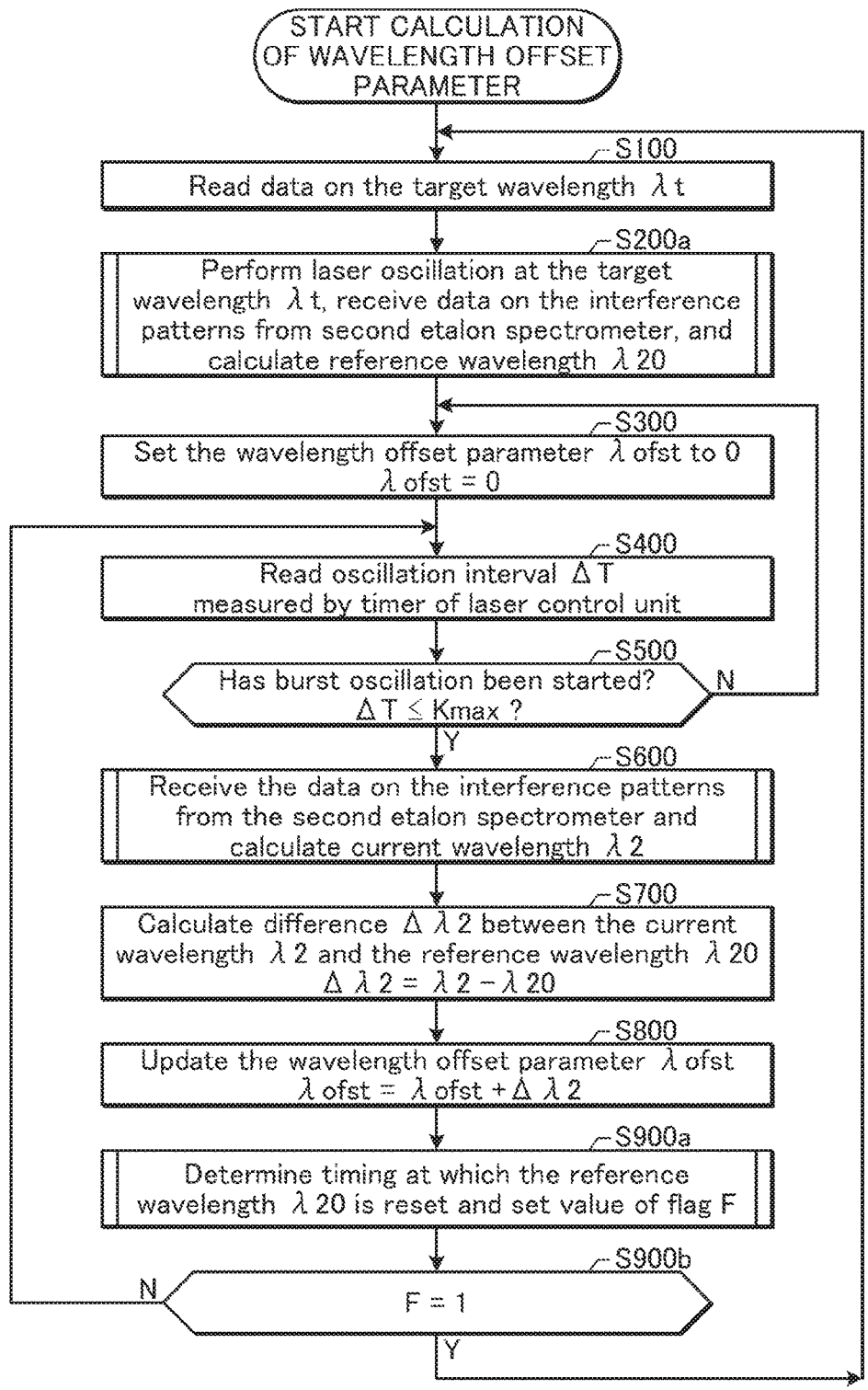
FIG. 11 is a flowchart illustrating processing of calculating a wavelength offset parameter in a narrow band laser apparatus according to a third embodiment of the present disclosure.

FIG. 11 is a flowchart illustrating processing of calculating a wavelength offset parameter in a narrow band laser apparatus according to a third embodiment of the present disclosure. The third embodiment may be different from the first embodiment in calculation of the reference wavelength $\lambda 20$ for calculating the wavelength offset parameter $\lambda$ofst.

The process in step S100 and the processes in steps S300 to S800 illustrated in FIG. 11 may be similar to the corresponding processes in the first embodiment that are described with reference to FIG. 6. In place of the processes in steps S200 and S900 that are described with reference to FIG. 6, processes in steps S200a, S900a, and S900b may be performed in the third embodiment.

In step S200a, the wavelength control unit 21 may perform the laser oscillation at the target wavelength $\lambda t$, and receive the integrated value of the data on the interference patterns from the second etalon spectrometer 19, thereby calculating the reference wavelength $\lambda 20$. The detail of the process is described later with reference to FIGS. 12 and 13. The laser oscillation performed in step S200a may not be performed with the low duty.

In step S900a, the wavelength control unit 21 may determine timing at which the reference wavelength $\lambda 20$ is reset and set a value of a flag F. The detail of the process is described later with reference to FIG. 14.

In step S900b, the wavelength control unit 21 may determine whether the value of the flag F set in step S900a is one or zero. If the value of the flag F is zero (NO in step S900b), the wavelength control unit 21 may return the process to step S400 and perform processes such as calculation of the wavelength offset parameter $\lambda$ofst without resetting the reference wavelength $\lambda 20$. If the value of the flag F is one (YES in step S900b), the wavelength control unit 21 may return the process to step S100, and reset the reference wavelength $\lambda 20$ in step S200a, thereby performing processes such as calculation of the wavelength offset parameter $\lambda$ofst. The value of the wavelength offset parameter $\lambda$ofst calculated in such a manner may be used to calibrate the measured wavelength $\lambda 1$ in steps S245 and S246 that are described above with reference to FIG. 5.

FIG. 12 is a flowchart illustrating the detail of the process of calculating the reference wavelength $\lambda 20$ illustrated in FIG. 11. The process illustrated in FIG. 12 may be executed by the wavelength control unit 21, as a subroutine of step S200a illustrated in FIG. 11. The process illustrated in FIG. 12 may be different from the process in the first embodiment in that the reference wavelength $\lambda 20$ is calculated not in the adjustment oscillation with low duty but in the normal oscillation.

First, in step S240a, the wavelength control unit 21 may control the rotation stage of the holder 24b that holds the prism 14b, based on the target wavelength $\lambda t$. The detail of step S240a is described later with reference to FIG. 13.

If the difference between the measured wavelength $\lambda 1$ and the target wavelength $\lambda t$ is within the allowable range in the next step S250, the current wavelength $\lambda 2$ that is based on the measurement result of the second etalon spectrometer 19 may be set as the reference wavelength $\lambda 20$ in steps S260 and S270. The processes in steps S250 to S270 may be similar to the processes described with reference to FIG. 7.

FIG. 13 is a flowchart illustrating the detail of the process of controlling the rotation stage, illustrated in FIG. 12. The process illustrated in FIG. 13 may be executed by the wavelength control unit 21 as a subroutine of step S240a illustrated in FIG. 12. In FIG. 13, a process in step S247a may be executed in place of the processes in steps S245, S246, and S247 that are described with reference to FIG. 5. In other words, the measured wavelength $\lambda 1$ may not be calibrated based on the wavelength offset parameter $\lambda$ofst but the measured wavelength $\lambda 1$ may be used for control of the rotation stage of the prism 14b to bring the measured wavelength $\lambda 1$ close to the target value. The other processes may be similar to those of FIG. 5.

Figure 14:
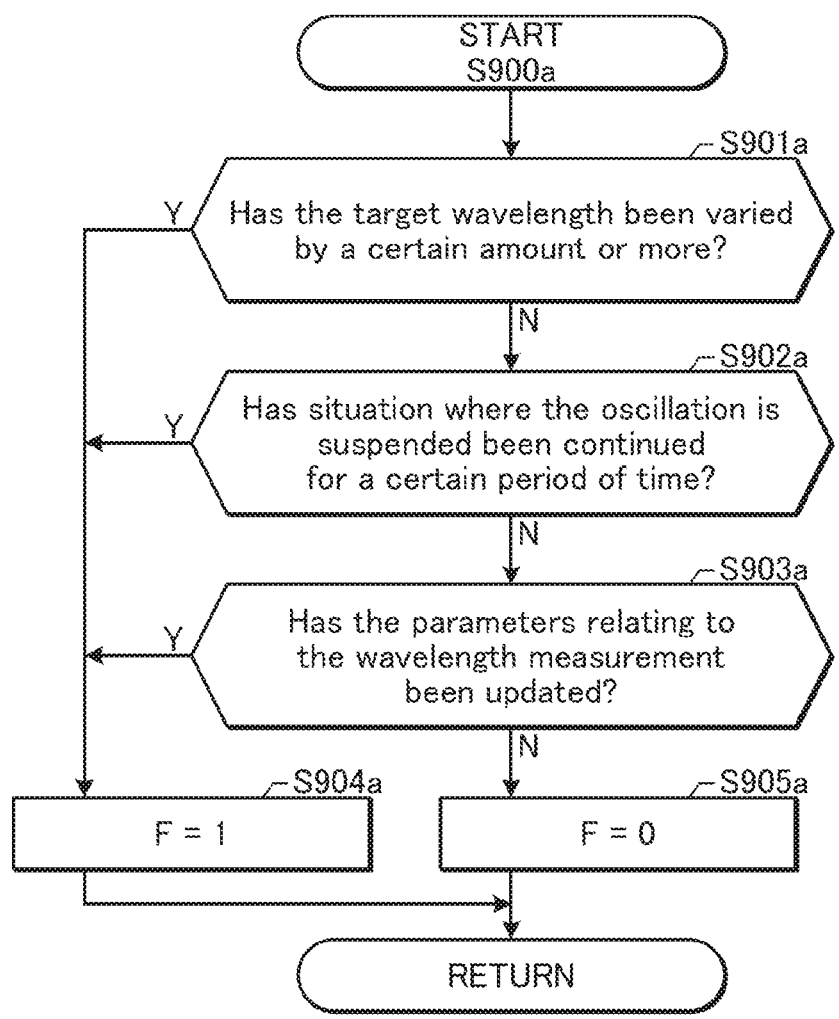
FIG. 14 is a flowchart illustrating a detail of a process of determining timing at which the reference wavelength λ20 is reset and setting a flag F, illustrated in FIG. 11.

FIG. 14 is a flowchart illustrating the detail of the process of determining the timing at which the reference wavelength $\lambda 20$ is reset and setting the flag F, illustrated in FIG. 11. The process illustrated in FIG. 14 may be executed by the wavelength control unit 21, as a subroutine of step S900a illustrated in FIG. 11.

First, in step S901a, the wavelength control unit 21 may determine whether the target wavelength has been varied by a certain amount or more. For example, it may be determined whether the target wavelength has been varied by an amount equal to or larger than the wavelength difference corresponding to the free spectral range $FSR_2$ of the second etalon spectrometer 19. The wavelength difference corresponding to the free spectral range $FSR_2$ of the second etalon spectrometer 19 may be, for example, 1 pm. If the target wavelength has been varied by the certain amount or more (YES in step S901a), the wavelength control unit 21 may set the value of the flag F to one in step S904a. If the value of the flag F is one, it may be shown that the reference wavelength λ20 is reset. If the target wavelength has not been varied by the certain amount or more (NO in step S901a), the wavelength control unit 21 may advance the process to step S902a.

In step S902a, the wavelength control unit 21 may determine whether a situation where the oscillation is suspended has been continued for a certain period of time. For example, it may be determined whether the situation where the oscillation is suspended has been continued for one minute or more. If the situation where the oscillation is suspended has been continued for the certain period of time (YES in step S902a), the wavelength control unit 21 may set the value of the flag F to one in step S904a. If the situation where the oscillation is suspended has not been continued for the certain period of time (NO in step S902a), the wavelength control unit 21 may advance the process to step S903a.

In step S903a, the wavelength control unit 21 may determine whether the parameter relating to the wavelength measurement has been updated. For example, it may be determined whether a threshold of a light quantity to measure the interference pattern has been updated. If the parameter relating to the wavelength measurement has been updated (YES in step S903a), the wavelength control unit 21 may set the value of the flag F to one in step S904a. If the parameter relating to the wavelength measurement has not been updated (NO in step S903a), the wavelength control unit 21 may advance the process to step S905a.

In step S905a, the wavelength control unit 21 may set the value of the flag F to zero. If the value of the flag F is zero, it may be shown that the reference wavelength λ20 is not to be reset.

After step S904a or step S905a, the wavelength control unit 21 may terminate the process of the flowchart and return the process to the processing illustrated in FIG. 11.

According to the third embodiment, the wavelength control unit 21 may omit the adjustment oscillation with low duty if the reference wavelength λ20 is to be reset. In the process of step S200a to reset the reference wavelength λ20, a required time for bringing the difference between the measured wavelength and the target wavelength described with reference to FIG. 12 within the allowable range may be about one second. Accordingly, it may be possible to rapidly acquire and reset a new reference wavelength λ20.

According to the third embodiment, the quantity of the light entering the second etalon spectrometer 19 is small and the second etalon spectrometer 19 is less influenced by variation of the duty. Therefore, it may be possible to accurately detect variation of the wavelength through comparison between the reference wavelength λ20 acquired in step S200a and the current wavelength λ2 acquired in step S600. This may make it possible to calibrate the measured wavelength λ1 based on the measurement result of the second etalon spectrometer 19 even if the measured wavelength λ1 detected by the first etalon spectrometer 18 is influenced by the variation of the duty. Consequently, it may be possible to prevent the wavelength control from becoming unstable due to the variation of the duty until next reset of the reference wavelength λ20.

5. Variation of Etalon Spectrometer (Fourth Embodiment)

Figure 15:
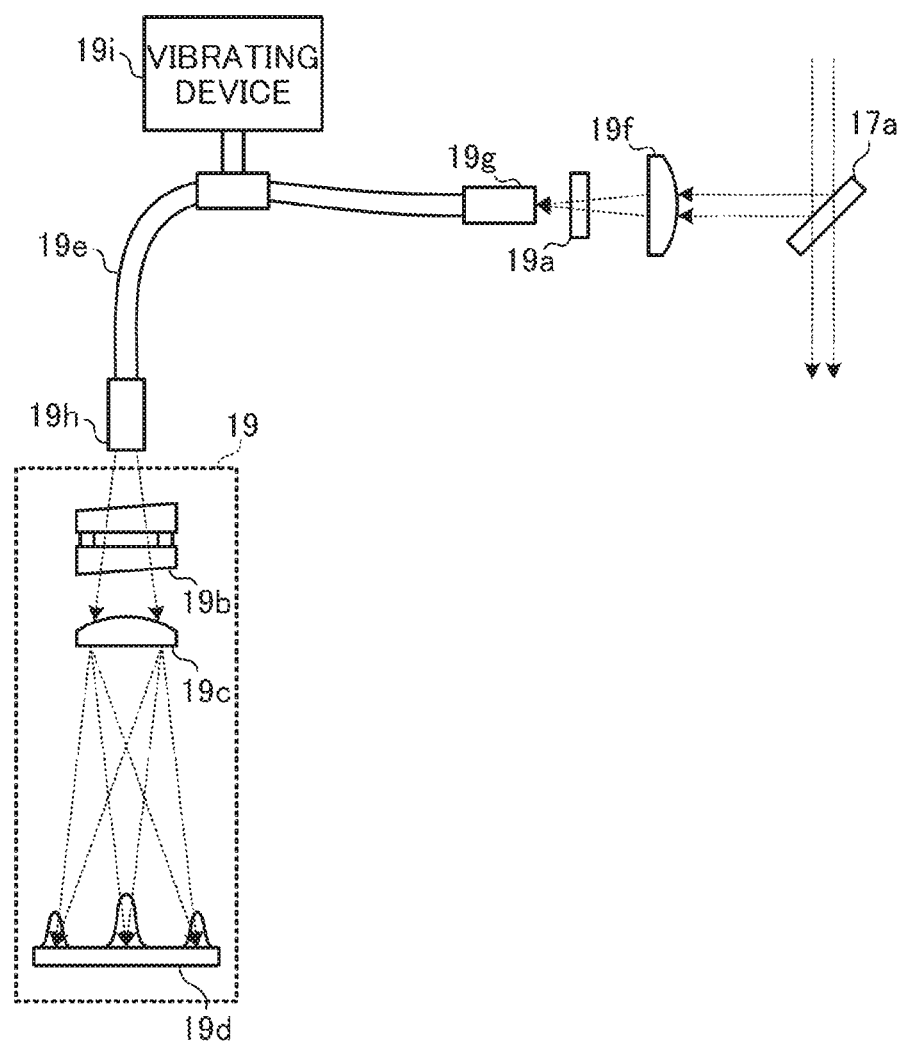
FIG. 15 illustrates a second etalon spectrometer used in a narrow band laser apparatus according to a fourth embodiment of the present disclosure.

FIG. 15 illustrates a second etalon spectrometer used in a narrow band laser apparatus according to a fourth embodiment of the present disclosure. In the fourth embodiment, the second etalon spectrometer 19 may include an optical fiber 19e that is disposed between the diffusion plate 19a and the etalon 19b.

A light condensing lens 19f may be disposed between the beam splitter 17a and the diffusion plate 19a. Condensing the pulse laser beam by the light condensing lens 19f may cause scattering light that has passed through the diffusion plate 19a to enter an incident end 19g of the optical fiber 19e. The scattering light that has entered the incident end 19g of the optical fiber 19e may be outputted from an exit end 19h of the optical fiber 19e toward the etalon 19b.

Further, a vibrating device 19i that vibrates the optical fiber 19e may be provided. The vibrating device 19i may be provided with an actuator (not illustrated). If coherency of the pulse laser beam is high, the vibrating device 19i vibrates the optical fiber 19e, which may reduce a speckle noise to be applied to the interference patterns. This may result in improvement of measurement accuracy of the wavelength of the pulse laser beam.

6. Configuration of Controller

Figure 16:
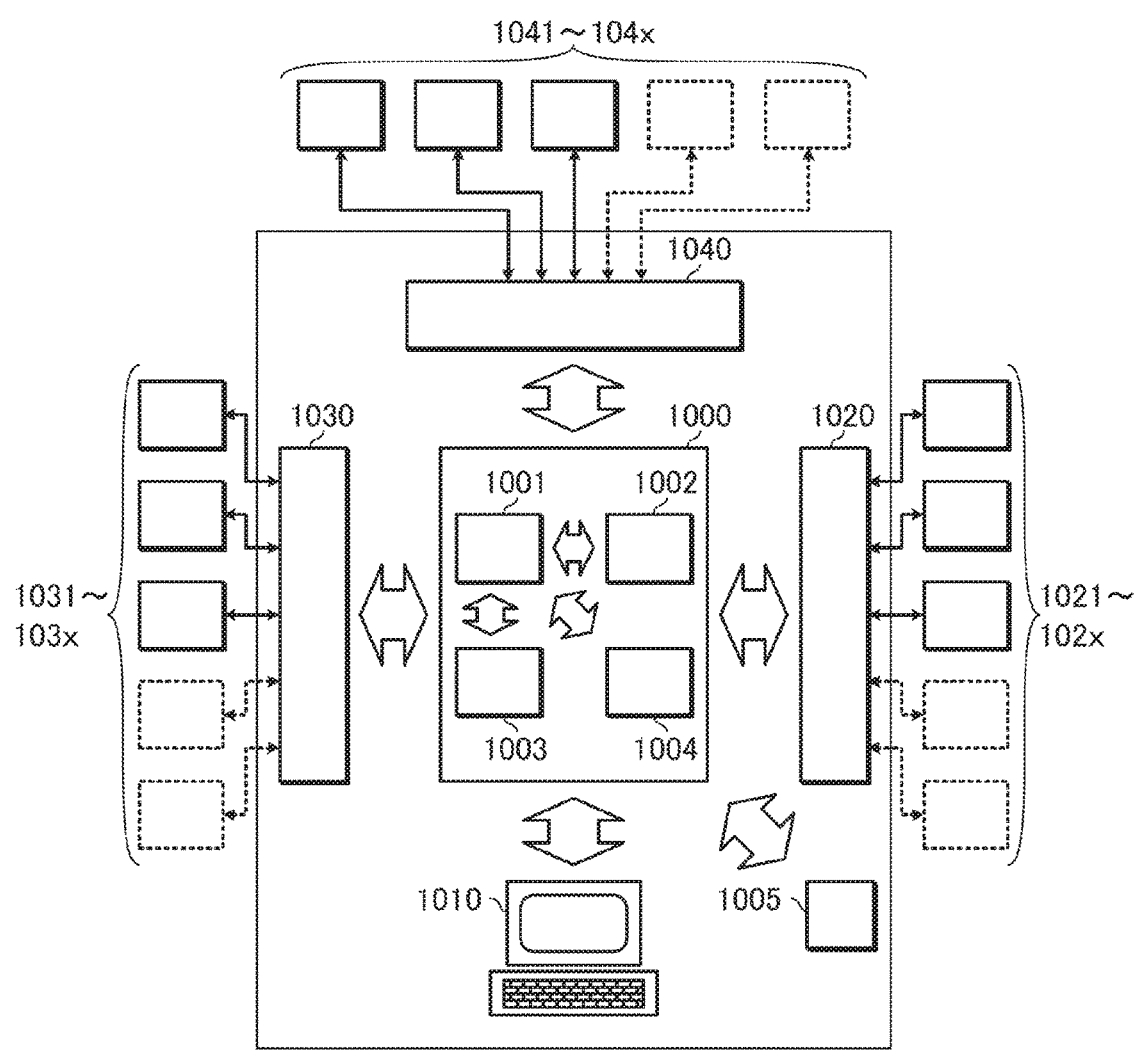
FIG. 16 is a block diagram schematically illustrating an exemplary configuration of a controller.

FIG. 16 is a block diagram schematically illustrating an exemplary configuration of a controller.

A controller such as the laser control unit 20 and the wavelength control unit 21 in the above-described embodiments may be constituted by a general-purpose control device such as a computer or a programmable controller. For example, the controller may be constituted as described below.

(Configuration)

The controller may include a processing unit 1000, a storage memory 1005, a user interface 1010, a parallel input/output (I/O) controller 1020, a serial I/O controller 1030, and an analog-to-digital (A/D) and digital-to-analog (D/A) converter 1040 that are connected to the processing unit 1000. The processing unit 1000 may include a central processing unit (CPU) 1001, a memory 1002, a timer 1003, and a graphics processing unit (GPU) 1004 that are connected to the CPU 1001.

(Operation)

The processing unit 1000 may read out programs stored in the storage memory 1005. The processing unit 1000 may execute read-out programs, read out data from the storage memory 1005 in accordance with the execution of the programs, or store data in the storage memory 1005.

The parallel I/O controller 1020 may be connected to devices 1021 to 102x communicable through parallel I/O ports. The parallel I/O controller 1020 may control communication using digital signals through parallel I/O ports that is performed in the process where the processing unit 1000 executes programs.

The serial I/O controller 1030 may be connected to devices 1031 to 103x communicable through serial I/O ports. The serial I/O controller 1030 may control communication using digital signals through serial I/O ports that is performed in the process where the processing unit 1000 executes programs.

The A/D and D/A converter 1040 may be connected to devices 1041 to 104x communicable through analog ports. The A/D and D/A converter 1040 may control communication using analog signals through analog ports that is performed in the process where the processing unit 1000 executes programs.

The user interface 1010 may be configured to display progress of executing programs by the processing unit 1000 to an operator or to receive instructions by the operator to the processing unit 1000 to stop execution of the programs or to execute interruption processing.

The CPU 1001 of the processing unit 1000 may perform arithmetic processing of programs. In the process where the CPU 1001 executes programs, the memory 1002 may temporally store programs or temporally store data in the arithmetic process. The timer 1003 may measure time or elapsed time to output the time or the elapsed time to the CPU 1001 in accordance with the execution of the programs. When image data is input to the processing unit 1000, the GPU 1004 may process the image data in accordance with the execution of the programs and output the results to the CPU 1001.

The devices 1021 to 102x communicable through parallel I/O ports, which are connected to the parallel I/O controller 1020, may be used for receiving or sending signals such as the oscillation trigger signal or a timing signal in the exposure device control unit 40, another controller, or the like.

The devices 1031 to 103x communicable through serial I/O ports, which are connected to the serial I/O controller 1030, may be the used for receiving or sending signals in the exposure device control unit 40, another controller, or the like.

The devices 1041 to 104x communicable through analog ports, which are connected to the A/ID and D/A converter 1040, may be various types of sensors such as the energy sensor 16c, the line sensors 18d and 19d, or the like.

With the above-described configuration, the controller may be capable of achieving the operation illustrated in the embodiments.

The aforementioned descriptions are intended to be taken only as examples, and are not to be seen as limiting in any way. Accordingly, it would be clear to those skilled in the art that variations on the embodiments of the present disclosure can be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the modifier "a" or "an" as used in the present specification and the scope of the appended claims should be interpreted as meaning "at least one" or "one or more".

The invention claimed is:

1. A narrow band laser apparatus, comprising:
   a laser resonator including an optical element to narrow a spectral width;
   a pair of discharge electrodes disposed with an optical path of a pulse laser beam of the laser resonator interposed therebetween;
   a power supply configured to apply a pulsed voltage to the pair of discharge electrodes;
   a first wavelength measurement device configured to measure a wavelength of the pulse laser beam outputted from the laser resonator and output a first measurement result;
   a second wavelength measurement device configured to measure the wavelength of the pulse laser beam outputted from the laser resonator and output a second measurement result; and
   a control unit configured to calibrate the first measurement result, based on the second measurement result, wherein
   the control unit calibrates the first measurement result, based on a difference between the second measurement result derived when the control unit controls the power supply to apply the pulsed voltage to the pair of discharge electrodes with a first repetition frequency and the second measurement result derived when the control unit controls the power supply to apply the pulsed voltage to the pair of discharge electrodes with a second repetition frequency, the second repetition frequency being higher than the first repetition frequency.

2. The narrow band laser apparatus according to claim 1, further comprising an optical system that branches a part of the pulse laser beam outputted from the laser resonator, into a first pulse laser beam and a second pulse laser beam, the first pulse laser beam having a first light quantity, and the second pulse laser beam having a second light quantity lower than the first light quantity, wherein
   the first wavelength measurement device is disposed in an optical path of the first pulse laser beam, measures a wavelength of the first pulse laser beam, and outputs the first measurement result, and
   the second wavelength measurement device is disposed in an optical path of the second pulse laser beam, measures a wavelength of the second pulse laser beam, and outputs the second measurement result.

3. The narrow band laser apparatus according to claim 1, wherein the second wavelength measurement device has resolution higher than resolution of the first wavelength measurement device.

4. The narrow band laser apparatus according to claim 2, wherein the optical system includes:
   an optical fiber, the optical fiber allowing at least the pulse laser beam that enters the second wavelength measurement device to pass through the optical fiber; and
   a vibrating device vibrating the optical fiber.

5. The narrow band laser apparatus according to claim 3, wherein
   the first wavelength measurement device outputs the first measurement result at a first frequency, and
   the second wavelength measurement device outputs the second measurement result at a second frequency, the second frequency being lower than the first frequency.

6. The narrow band laser apparatus according to claim 5, wherein
   the first wavelength measurement device measures a wavelength of the pulse laser beam for each pulse, and outputs the first measurement result for each pulse, and
   the second wavelength measurement device measures wavelengths of the pulse laser beam for a plurality of pulses, and averages the wavelengths of the plurality of pulses to output the second measurement result.

7. A narrow band laser apparatus, comprising:
a laser resonator including an optical element to narrow a spectral width;
a first wavelength measurement device configured to measure a wavelength of a pulse laser beam outputted from the laser resonator and output a first measurement result;
a second wavelength measurement device configured to measure the wavelength of the pulse laser beam outputted from the laser resonator and output a second measurement result; and
a control unit configured to calibrate the first measurement result, based on the second measurement result, wherein
the control unit acquires the second measurement result as a reference wavelength in at least one of situations where a target wavelength is varied by a certain amount or more, where oscillation suspension of the pulse laser beam is continued for a certain period of time or more, and where a parameter relating to wavelength measurement is updated,
the control unit further acquires the second measurement result after acquiring the reference wavelength, and
the control unit calibrates the first measurement result, based on a difference between the reference wavelength and the second measurement result after acquiring the reference wavelength.

8. The narrow band laser apparatus according to claim 7, further comprising an optical system that branches a part of the pulse laser beam outputted from the laser resonator, into a first pulse laser beam and a second laser beam, the first pulse laser beam having a first light quantity, and the second pulse laser beam having a second light quantity lower than the first light quantity, wherein the first wavelength measurement device is disposed in an optical path of the first pulse laser beam, measures a wavelength of the first pulse laser beam, and outputs the first measurement result, and
the second wavelength measurement device is disposed in an optical path of the second pulse laser beam, measures a wavelength of the second pulse laser beam, and outputs the second measurement result.

9. The narrow band laser apparatus according to claim 7, wherein the second wavelength measurement device has resolution higher than resolution of the first wavelength measurement device.

10. The narrow band laser apparatus according to claim 8, wherein the optical system includes:
an optical fiber, the optical fiber allowing at least the pulse laser beam that enters the second wavelength measurement device to pass through the optical fiber; and
a vibrating device vibrating the optical fiber.

11. The narrow band laser apparatus according to claim 9, wherein
the first wavelength measurement device outputs the first measurement result at a first frequency, and
the second wavelength measurement device outputs the second measurement result at a second frequency, the second frequency being lower than the first frequency.

12. The narrow band laser apparatus according to claim 11, wherein
the first wavelength measurement device measures a wavelength of the pulse laser beam for each pulse, and outputs the first measurement result for each pulse, and
the second wavelength measurement device measures wavelengths of the pulse laser beam for a plurality of pulses, and averages the wavelengths of the plurality of pulses to output the second measurement result.

* * * * *